(12) United States Patent
Murai

(10) Patent No.: US 9,544,554 B2
(45) Date of Patent: Jan. 10, 2017

(54) LIGHT SOURCE DEVICE, AND IMAGE PROJECTION APPARATUS EMPLOYING LIGHT SOURCE DEVICE

(71) Applicant: Toshiharu Murai, Kanagawa (JP)

(72) Inventor: Toshiharu Murai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 156 days.

(21) Appl. No.: 14/504,585

(22) Filed: Oct. 2, 2014

(65) Prior Publication Data
US 2015/0109584 A1    Apr. 23, 2015

(30) Foreign Application Priority Data

Oct. 23, 2013  (JP) .................................. 2013-219856
Jul. 17, 2014   (JP) .................................. 2014-147030

(51) Int. Cl.
| | | |
|---|---|---|
| G03B 21/20 | (2006.01) | |
| H04N 9/31 | (2006.01) | |
| G03B 33/08 | (2006.01) | |
| G02B 26/00 | (2006.01) | |

(52) U.S. Cl.
CPC ............ *H04N 9/3114* (2013.01); *G03B 21/204* (2013.01); *G03B 33/08* (2013.01); *H04N 9/3161* (2013.01); *H04N 9/3164* (2013.01); *G02B 26/008* (2013.01)

(58) Field of Classification Search
CPC ....... G03B 21/204; G03B 21/14; G03B 21/00; H04N 9/31; H04N 5/74; G02B 26/00; F21V 14/08
See application file for complete search history.

(56) References Cited

U.S. PATENT DOCUMENTS

| | | | |
|---|---|---|---|
| 2008/0151356 A1 | 6/2008 | Fujita et al. | |
| 2011/0043764 A1* | 2/2011 | Narikawa | G03B 21/204 |
| | | | 353/31 |
| 2011/0242497 A1* | 10/2011 | Fukano | G02B 26/008 |
| | | | 353/31 |

(Continued)

FOREIGN PATENT DOCUMENTS

| | | |
|---|---|---|
| JP | 2004-341105 | 12/2004 |
| JP | 2009-277516 | 11/2009 |

(Continued)

*Primary Examiner* — Sultan Chowdhury
*Assistant Examiner* — Dannell L Owens
(74) *Attorney, Agent, or Firm* — Harness, Dickey & Pierce, P.L.C.

(57) ABSTRACT

A light source device includes a first light source to emit first light having a first wavelength range; a wavelength convertor, disposed on an optical path of the first light, to receive the first light to emit light having other wavelength range different from the first wavelength range; a cyclical movement unit to cyclically move the wavelength convertor while crossing the optical path of the first light; optical parts to define an optical path of the first light, and an optical path of the light emitted from the wavelength convertor; a detector to detect a cyclic movement condition of the cyclical movement unit; and a received light quantity reducing unit to reduce light quantity of the first light received by the wavelength convertor when a cyclic movement condition detected by the detector satisfies an abnormal condition while outputting the first light or the light having other wavelength range to outside.

19 Claims, 20 Drawing Sheets

(56) References Cited

U.S. PATENT DOCUMENTS

| | | |
|---|---|---|
| 2012/0044465 A1 | 2/2012 | Murai et al. |
| 2013/0107230 A1 | 5/2013 | Murai |
| 2013/0201408 A1 | 8/2013 | Murai |
| 2013/0308104 A1 | 11/2013 | Nishimori et al. |
| 2014/0028983 A1 | 1/2014 | Fujita et al. |
| 2014/0036241 A1 | 2/2014 | Nishimori et al. |
| 2014/0049755 A1 | 2/2014 | Nishimori et al. |
| 2014/0071407 A1 | 3/2014 | Takahashi et al. |
| 2014/0071408 A1 | 3/2014 | Takahashi et al. |
| 2014/0140038 A1* | 5/2014 | Gerets .................... G03B 21/16 362/84 |
| 2014/0240679 A1 | 8/2014 | Nishimori et al. |
| 2014/0240680 A1 | 8/2014 | Nishimori et al. |
| 2014/0268069 A1 | 9/2014 | Takahashi et al. |

FOREIGN PATENT DOCUMENTS

| | | |
|---|---|---|
| JP | 2011-117989 | 6/2011 |
| JP | 2011-158726 | 8/2011 |
| JP | 2012-141581 | 7/2012 |

\* cited by examiner

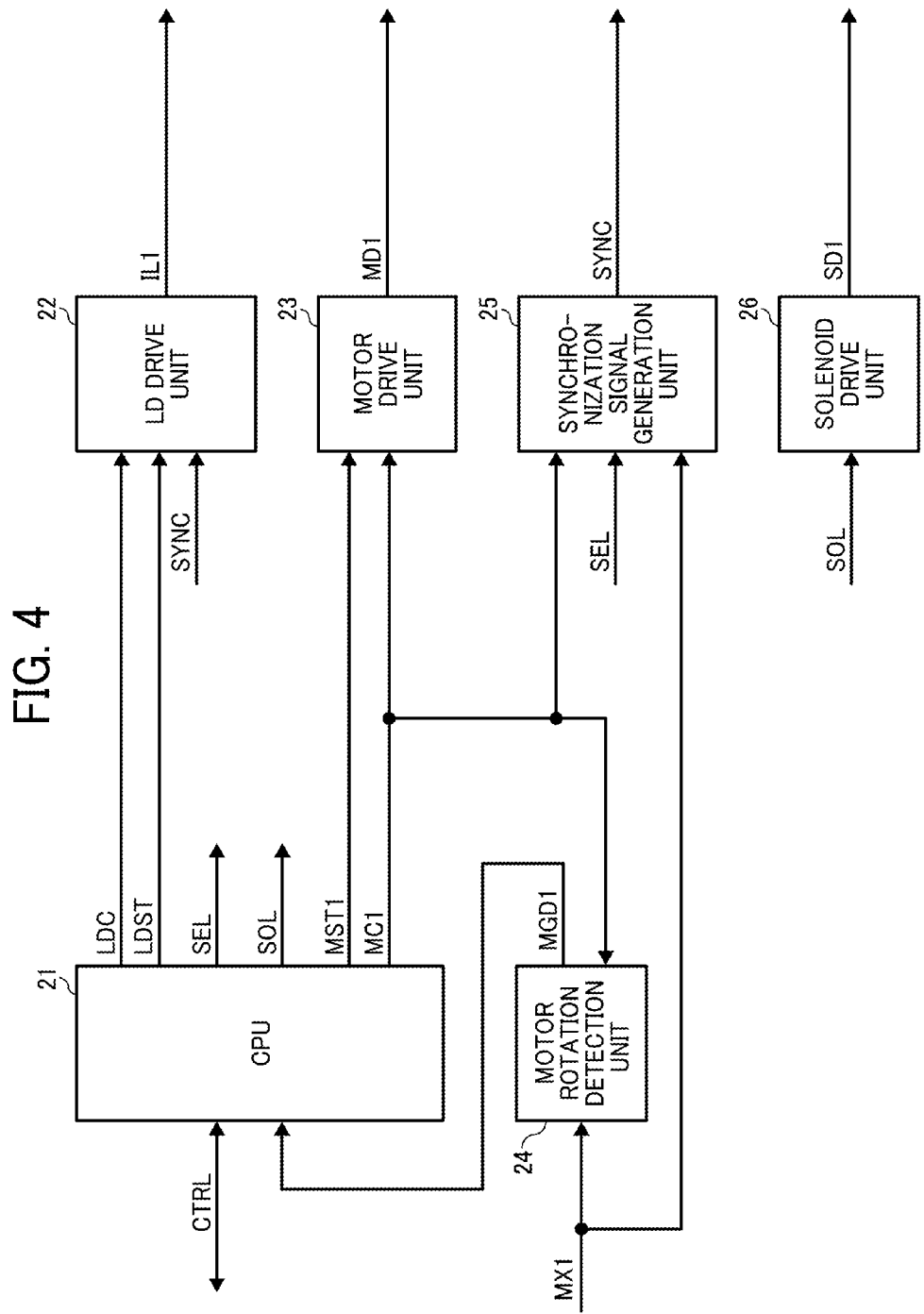

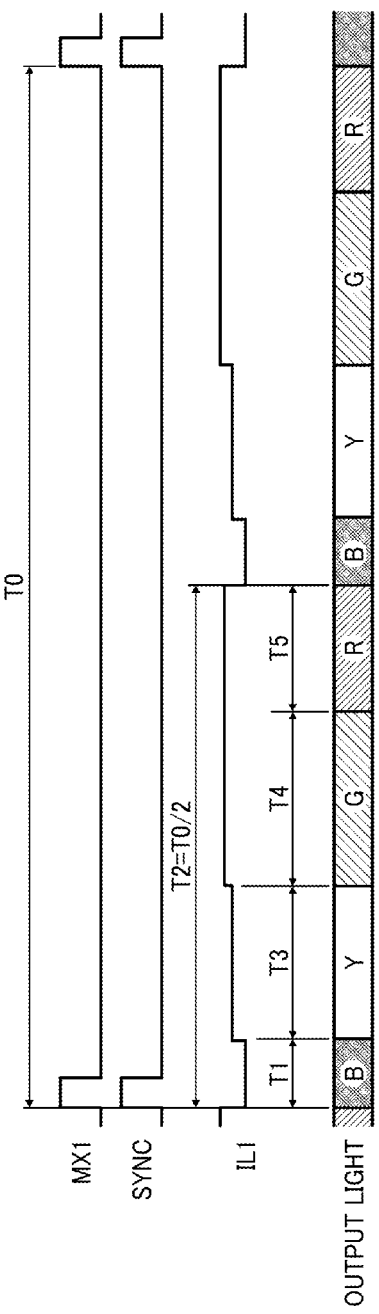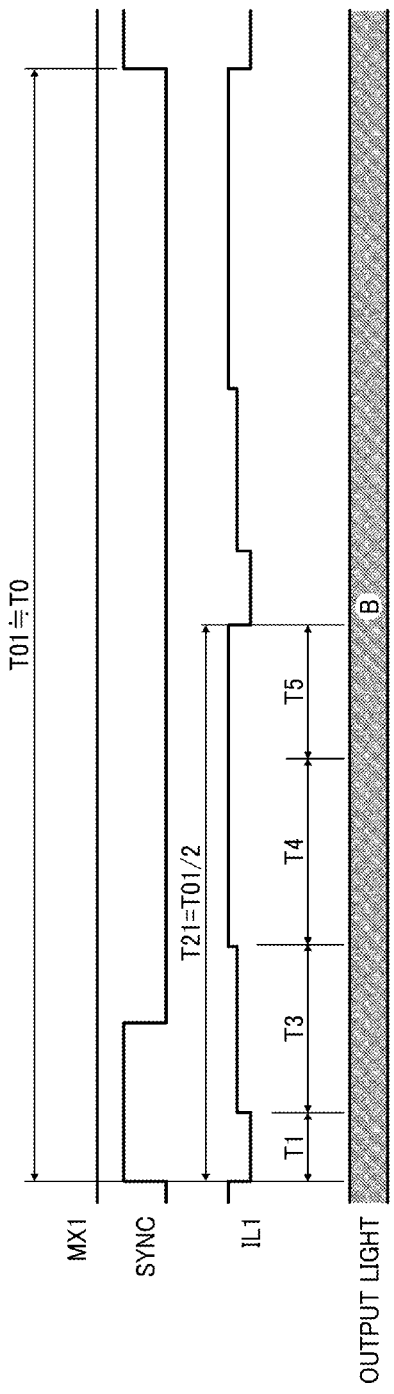

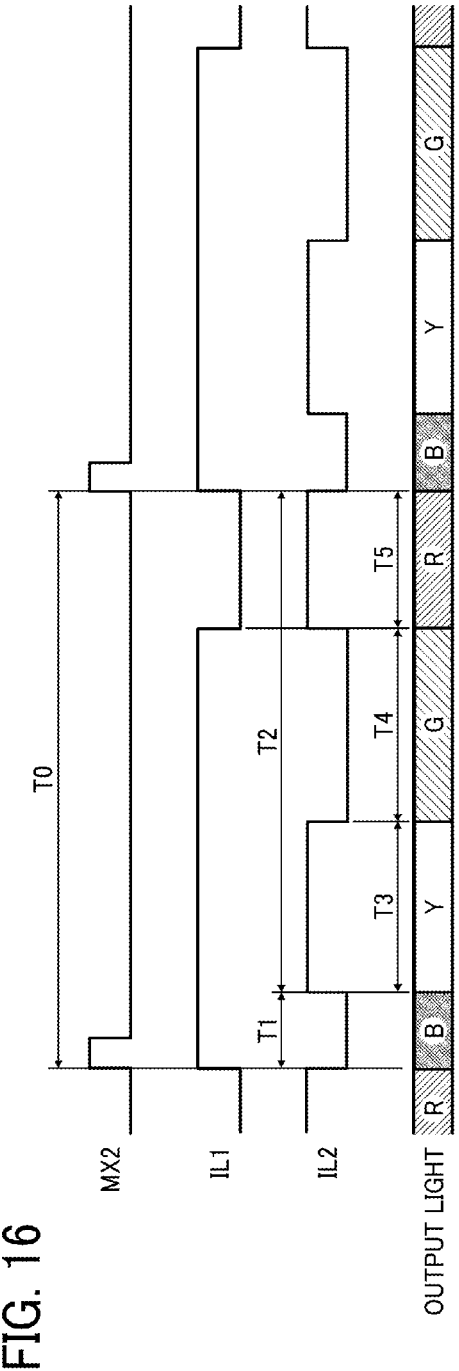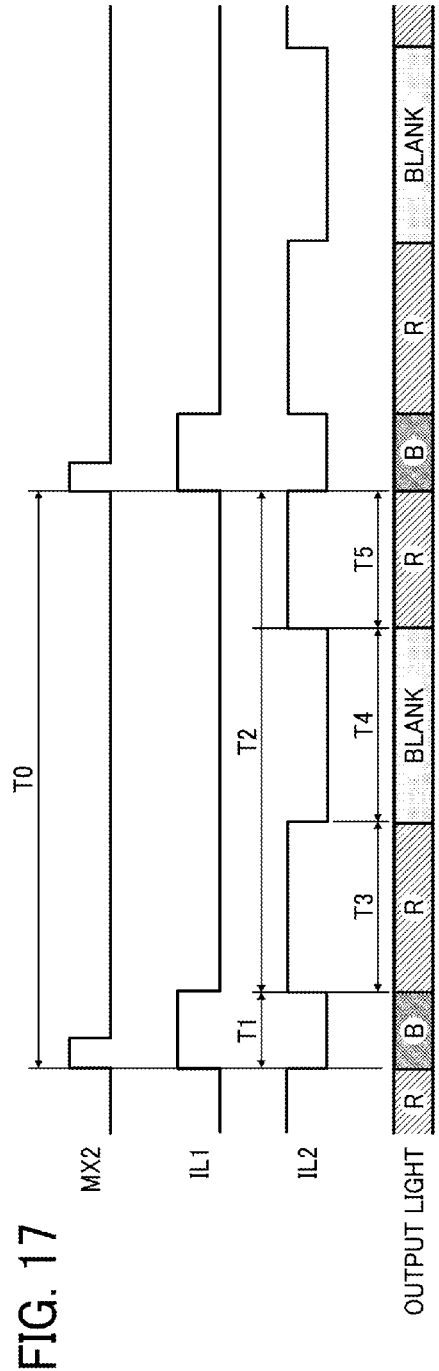

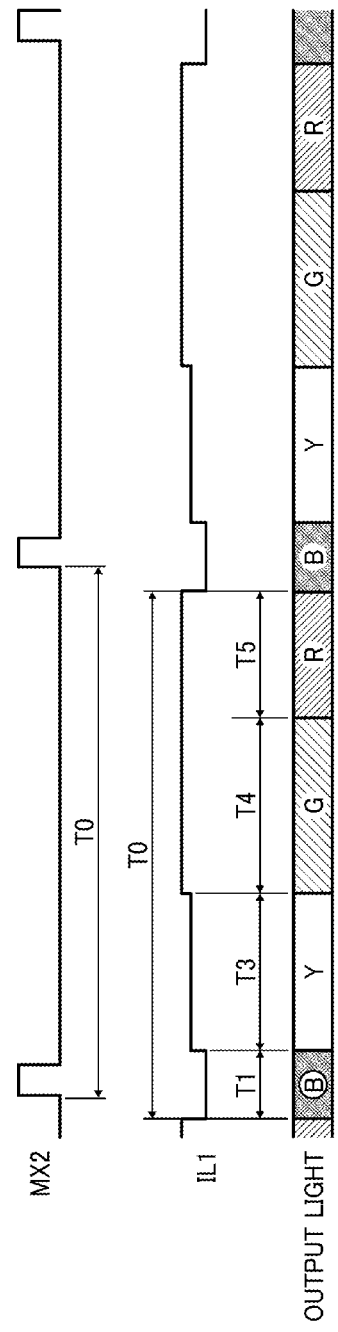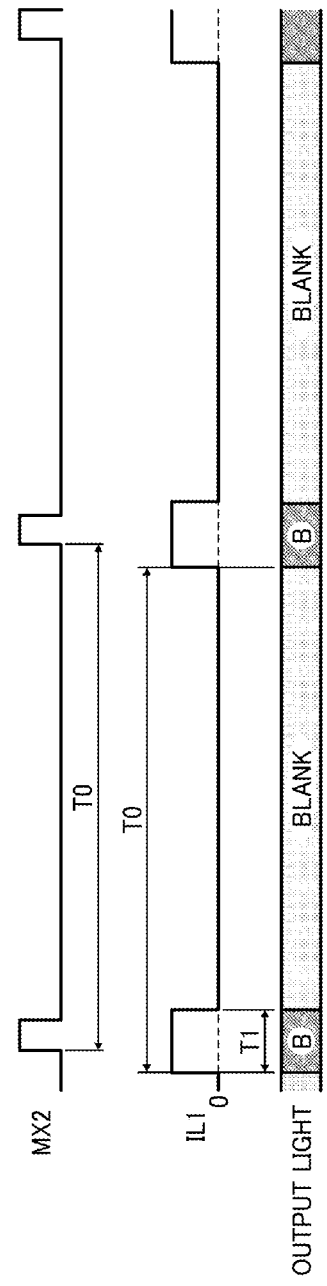

LIGHT SOURCE DEVICE, AND IMAGE PROJECTION APPARATUS EMPLOYING LIGHT SOURCE DEVICE

CROSS-REFERENCE TO RELATED APPLICATION

This application claims priority pursuant to 35 U.S.C. §119(a) to Japanese Patent Application Nos. 2013-219856, filed on Oct. 23, 2013, and 2014-147030, filed on Jul. 17, 2014 in the Japan Patent Office, the disclosure of which are incorporated by reference herein in their entirety.

BACKGROUND

Technical Field

The present invention relates to a light source device that emits light to an irradiation target, and an image projection apparatus employing the light source device.

Background Art

Screen images of personal computers, video images, and image data stored in memory cards can be transmitted to image projection apparatuses known as projectors that can project images onto a screen using a light source device. Meetings, presentations, and trainings are conducted using display devices having a large screen. Projectors are relatively inexpensive, and small and light weight, with which projectors can be carried easily, which means portability is good. Projectors are used frequently for meetings in small meeting rooms, meeting spaces set by partitions in offices with an increased demand for in-personal communication scenes and situations. Further, even if meeting rooms are not available, projectors can be used at open spaces such as passage, in which a projector can project images on a wall for a meeting.

As to the projectors, light emitted from a light source device is focused on a micro mirror display device known as a digital micro mirror device (DMD), or a liquid crystal plate, and then an image is displayed on a screen. As to the projectors, a high intensity discharge lamp such as high pressure mercury lamp is conventionally used as the light source, but other light sources have been developed. For example, a light source device employing the solid type light emitting element and phosphor has been available, in which the solid type light emitting element emits excitation light, and the phosphor, used as a wavelength convertor, absorbs the excitation light and coverts the light to a plurality of lights having different wavelength ranges. The solid type light emitting element can employ, for example, semiconductor elements such as a light emitting diode (LED), a laser diode (LD), or organic electroluminescence (OEL).

As to light source apparatuses employing a solid type light emitting element and phosphor, the phosphor used as a wavelength converter is disposed on a rotatable member, and a configuration for rotating the rotatable member is employed. As to this light source apparatus, a phosphor layer that generates heat when receiving excitation light from a light source can be cooled with an effect of rotation of the rotatable member.

However, if rotation of the rotatable member stops or decreases due to malfunction of a drive motor (i.e., when abnormality occurs to rotation condition), visible light emittable from the phosphor layer cannot be normally output to outside, light quantity of excitation light received by the phosphor layer on the rotatable member per unit time increases, and cooling effect by rotating the rotatable member decreases, with which abnormal temperature increase may occur to the phosphor layer.

If abnormal high temperature occurs to the phosphor layer, light having a designed wavelength range cannot be emitted, and light quantity of emission light may decrease greatly, with which deterioration of the phosphor layer may occur. Typically, a light source apparatus that can output light having higher power is employed to enhance image luminance projected by the projector. To output light having higher power from the phosphor layer, excitation light having greater power is required, in which abnormal high temperature may more likely occur to the phosphor layer, and deterioration of the phosphor layer may become prominent.

To cope with this situation, for example, when abnormality occurs to the rotation condition of the rotatable member, light emission of the light source is stopped to prevent deterioration of the phosphor layer. However, when light emission of the light source is stopped, display of a projection image by the projector also stops. Therefore, information such as occurrence of abnormality and a coping process to the abnormality cannot be informed to a user using a projection image by the projector. Other than using the projection image by the projector for informing abnormality, the information can be informed to a user by disposing a dedicated reporting unit used for reporting information. However, the dedicated reporting unit may become a capability-enhanced reporting unit to report detailed information to a user, which increases cost compared to a simple reporting unit such as a buzzer that generates alarm sound.

SUMMARY

In one aspect of the present invention, a light source device is devised. The light source device includes a first light source to emit first light having a first wavelength range; a wavelength convertor, disposed on an optical path of the first light emitted from the first light source, to receive the first light having the first wavelength range from the first light source to emit light having other wavelength range different from the first wavelength range of the first light; a cyclical movement unit to cyclically move the wavelength convertor while crossing the optical path of the first light emitted from the first light source; optical parts to define an optical path of the first light emitted from the first light source, and an optical path of the light emitted from the wavelength convertor; a detector to detect a cyclic movement condition of the cyclical movement unit; and a received light quantity reducing unit to reduce light quantity of the first light received by the wavelength convertor when a cyclic movement condition detected by the detector satisfies a given abnormal condition while outputting the first light emitted from the first light source having the first wavelength range or the light having other wavelength range emitted from the wavelength convertor to outside the light source device.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 4 is a block diagram of a control unit of the light source device of FIG. 1;

FIG. 5 is a timing chart of an operation when the speed of a phosphor wheel becomes a given rotation speed or more;

FIG. 6 is a timing chart of an operation when the speed of a phosphor wheel becomes less than the given rotation speed;

FIG. 16 is a timing chart of an operation when the speed of a phosphor wheel of the second example embodiment becomes a given rotation speed or more;

FIG. 17 is a timing chart of an operation when the speed of a phosphor wheel of the second example embodiment becomes less than the given rotation speed;

FIG. 22 is a timing chart of an operation when the speed of a phosphor wheel of variant example 2 becomes a given rotation speed or more;

FIG. 23 is a timing chart of an operation when the speed of a phosphor wheel of variant example 2 becomes less than the given rotation speed;

FIG. 28($b$) is an example image when an abnormal rotation occurs to a motor;

Figure 1:
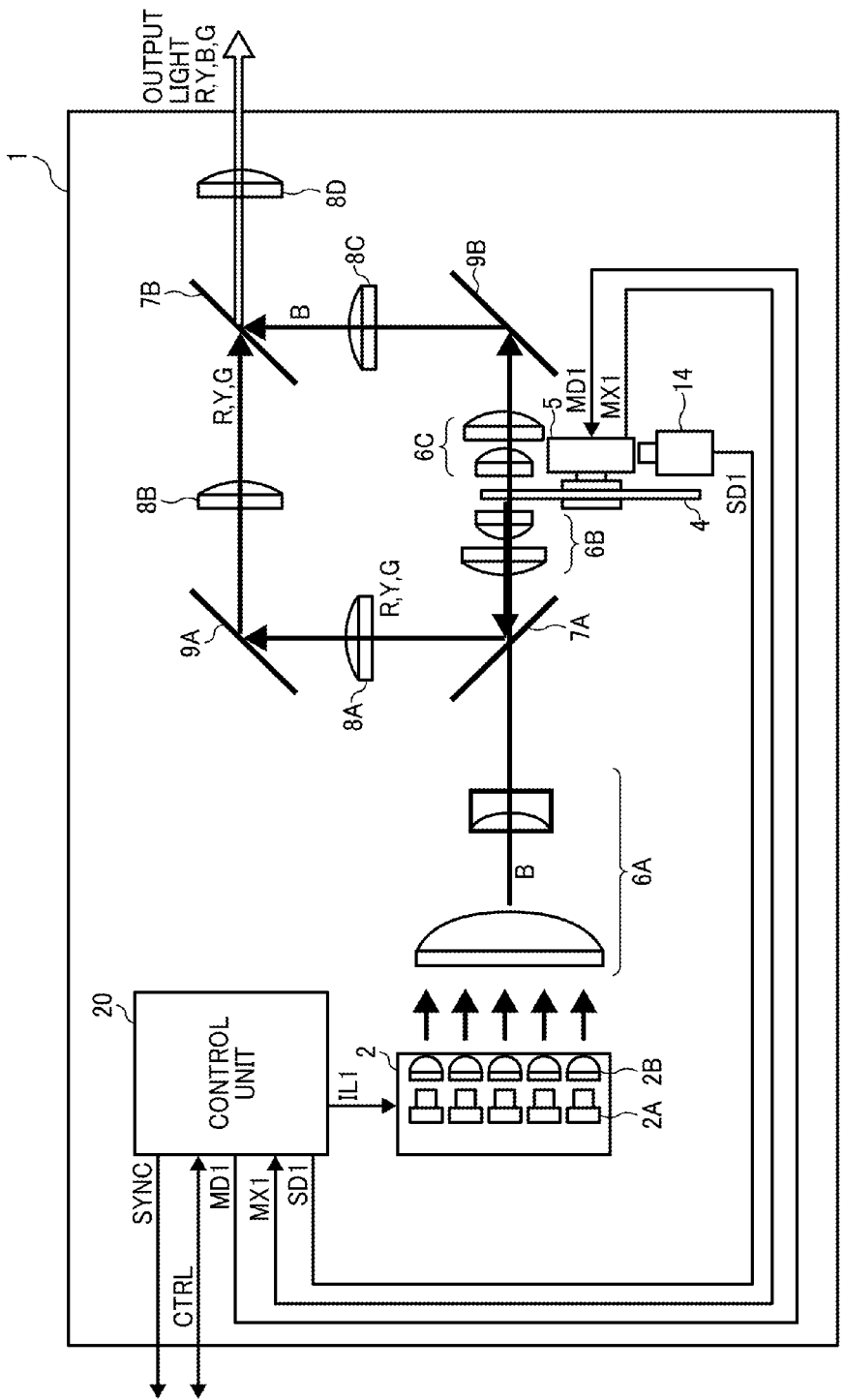
FIG. 1 is a schematic configuration of a light source device according to a first example embodiment.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views shown in the drawings, specific terminology is employed for the sake of clarity, the present disclosure is not limited to the specific terminology so selected and it is to be understood that each specific element includes all technical equivalents that operate in a similar manner and achieve a similar result. Referring now to the drawings, an apparatus or system according to an example embodiment is described hereinafter.

First Example Embodiment

A description is given of a light source device according to a first example embodiment of the present invention. The light source device can be employed for a projector used as an image projection apparatus. FIG. 1 is a schematic configuration of a light source device 1 according to the first example embodiment.

The light source device 1 includes, for example, a laser diode (LD) module 2 used as a light source, a control unit 20 that controls the LD module 2, a phosphor wheel 4 used as a rotatable member, a motor 5 used as a driver or a drive unit that drives rotation of the phosphor wheel 4, and various optical units. A layer of phosphor material (hereinafter, phosphor layer) used as a wavelength convertor is disposed on the phosphor wheel 4. As to the first example embodiment, the phosphor wheel 4 and the motor 5 can configure a cyclical movement unit that can cyclically move the phosphor layer disposed on the phosphor wheel 4.

As to the light source device 1 of the first example embodiment, light having a given wavelength range emitted from the LD module 2 irradiates onto the phosphor layer disposed on the phosphor wheel 4, with which light having a wavelength range different from the given wavelength range of the light emitted from the LD module 2 can be emitted from the phosphor layer. As to the light source device 1, the light emitted from the LD module 2 and the light emitted from the phosphor layer on the phosphor wheel 4 can be continuously output time-divisionally with a given periodic cycle to outside of the light source device 1.

Control signal CTRL input to the control unit 20 from an external apparatus or a user operation panel can be used to control the light source device 1. Further, the control signal CTRL is output from the control unit 20 to the external apparatus or the user operation panel to report condition of the light source device 1. Communication of the control signal CTRL can be conducted by inputting and outputting corresponding command and data using a serial communication interface such as inter integrated circuit communications ($I^2C$) bus and serial-peripheral interface (SPI).

Upon receiving a control signal CTRL for activation command, the control unit 20 outputs a motor drive signal MD1 for activating the motor 5 that drives a rotation of the phosphor wheel 4. The motor 5 is disposed with a detector in or outside of the motor 5 to detect a rotation condition, wherein the detector outputs rotation detection signal MX1.

The control unit 20 detects the rotation condition of the motor 5 by receiving the rotation detection signal MX1. Then, upon detecting that the motor 5 becomes a given rotation speed, the control unit 20 generates signal SYNC synchronized to a rotation cycle of the motor 5 and outputs the signal SYNC, and also outputs the LD drive signal IL1 to the LD module 2 to drive a laser diode (LD) 2A of the LD module 2.

The LD 2A, driven by the LD drive signal Ill, emits a laser beam having a given wavelength range. As to the first example embodiment, the LD 2A that can emit a laser beam having blue wavelength range is employed but not limited hereto. For example, the LD 2A that can emit a laser beam having other wavelength range can be employed.

Further, as to the first example embodiment, a plurality of the LDs 2A are configured as a LD module 2, which is used as a light source. The LD module 2 includes the plurality of the LDs 2A and a plurality of collimator lenses 2B corresponded to each of the LDs 2A (hereinafter, collimator lens unit 2B), in which the collimator lens unit 2B collimates the laser beam emitted from each of the LDs 2A to parallel light. A casing of the LD module 2 supports the plurality of the LDs 2A and the collimator lens unit 2B at desired positions, and dissipates heat generated by the LDs 2A to suppress the temperature increase of the LDs 2A within a given range, in which the casing of the LD module 2 can function as a heat sink.

Figure 2:
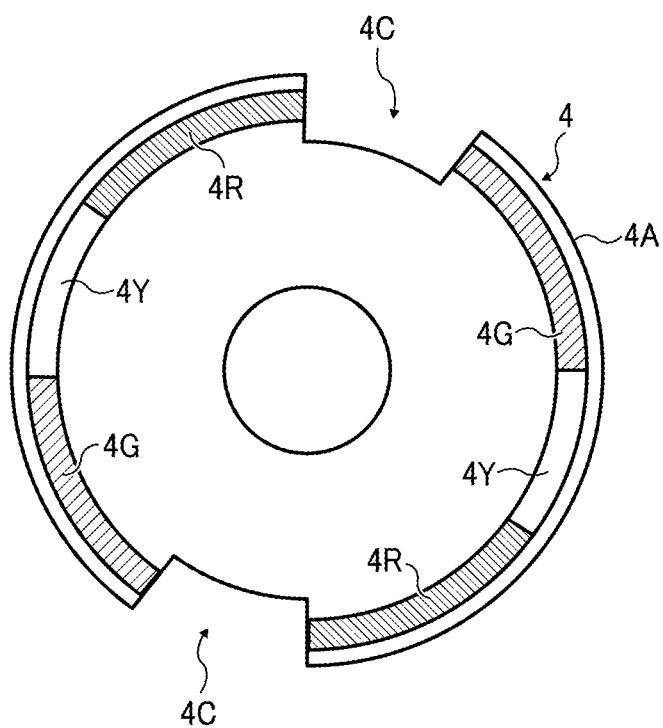
FIG. 2 is a front view of an example of a phosphor wheel of the light source device of FIG. 1.

FIG. 2 is a front view of the phosphor wheel 4. A plurality of blue light emitted from the LD module 2 is condensed by a first light condensing optical system 6A, passes a first dichroic mirror 7A, is further condensed by a second light condensing optical system 6B, and is then guided to the phosphor wheel 4. As illustrated in FIG. 2, the phosphor wheel 4 is composed of, for example, a base plate 4A, which may be a metal disk, and phosphor used as a wavelength convertor disposed on one face of the base plate 4A, in which the phosphor is formed as a layer along periphery of the base plate 4A.

Specifically, a plurality of phosphor layers of different types, which can emit light having a plurality of wavelength ranges (i.e., different lights), is disposed on the phosphor wheel 4. Specifically, a red phosphor layer 4R, a yellow phosphor layer 4Y, and a green phosphor layer 4G are disposed on the phosphor wheel 4. The red phosphor layer 4R is a layer including phosphor that emits red light R having red wavelength range when blue light B having blue wavelength range is irradiated on the red phosphor layer 4R. Further, the green phosphor layer 4G is a layer including phosphor that emits green light G having green wavelength range when blue light B having blue wavelength range is irradiated on the green phosphor layer 4G, and the yellow phosphor layer 4Y is a layer including phosphor that emits yellow light Y when blue light B having blue wavelength range is irradiated on the yellow phosphor layer 4Y. As to the first example embodiment, a light passing portion 4C is formed at a part of the base plate 4A of the phosphor wheel 4 so that blue light B can pass through the base plate 4A. For example, the light passing portion 4C may be a cut-out portion formed for the base plate 4A.

As illustrated in FIG. 2, each of the phosphor layers 4R, 4Y, 4G and the light passing portion 4C are formed on a semicircle of the phosphor wheel 4. Therefore, two sets of the phosphor layers 4R, 4Y, 4G and the light passing portion 4C are formed on the phosphor wheel 4. The phosphor wheel 4 is disposed at a given position so that each of the phosphor layers 4R, 4Y, 4G and the light passing portion 4C can cross an optical path of blue light B when the phosphor wheel 4 is rotated by a driving force of the motor 5.

In this configuration, when blue light B guided from the second light condensing optical system 6B enters the phosphor wheel 4 rotating in one direction, red light R having red wavelength range is generated when blue light B irradiates on the red phosphor layer 4R, green light G having green wavelength rang is generated when blue light B irradiates on the green phosphor layer 4G, yellow light Y having yellow wavelength range is generated when blue light B irradiates on the yellow phosphor layer 4Y, and blue light B passes through the phosphor wheel 4 when blue light B passes through the light passing portion 4C.

The red light R, green light G, and yellow light Y having the respective wavelength range generated at each of the phosphor layers 4R, 4Y, 4G are condensed by the second light condensing optical system 6B and guided to the first dichroic mirror 7A. The first dichroic mirror 7A can pass the blue light B having blue wavelength range, and reflect light having other wavelength range. Therefore, the blue light B emitted from the LD module 2 passes through the first dichroic mirror 7A, and the light R, Y, G having respective wavelength ranges, different from blue wavelength range, generated on each of the phosphor layers 4R, 4Y, 4G of the phosphor wheel 4, are reflected on the first dichroic mirror 7A. The light R, Y, G from each of the phosphor layers 4R, 4Y, 4G are reflected at the first dichroic mirror 7A, and then guided to a second dichroic mirror 7B via a first relay lens 8A, a first reflection mirror 9A, and a second relay lens 8B.

The second dichroic mirror 7B reflects the blue light B having blue wavelength range, and passes through light having other wavelength ranges. Therefore, the lights R, Y, G from each of the phosphor layers 4R, 4Y, 4G pass through the second dichroic mirror 7B, and are output outside the light source device 1 via a fourth relay lens 8D.

Meanwhile, the blue light B passing through the light passing portion 4C of the phosphor wheel 4 is condensed by the third light condensing optical system 6C, and is guided to the second dichroic mirror 7B via a second reflection mirror 9B and a third relay lens 8C. Because the second dichroic mirror 7B reflects the blue light B having blue wavelength range as above described, the blue light B guided to the second dichroic mirror 7B is reflected on the second dichroic mirror 7B, and then output outside the light source device 1 via the fourth relay lens 8D.

As to the first example embodiment, with a cycle corresponding to a half cycle of the phosphor wheel 4 rotating in one direction, the blue light B from the LD module 2, the red light R from the red phosphor layer 4R on the phosphor wheel 4, the yellow light Y from the yellow phosphor layer 4Y on the phosphor wheel 4, and the green light G from the green phosphor layer 4G on the phosphor wheel 4 are sequentially output from the same portion of the light source device 1.

Figure 3A:
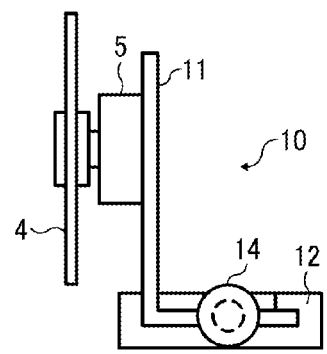
FIG. 3A is a schematic configuration of the wheel advancing and retreating mechanism that advances and retreats the phosphor wheel viewed from the advancing and retreating direction of the phosphor wheel.
Figure 3B:
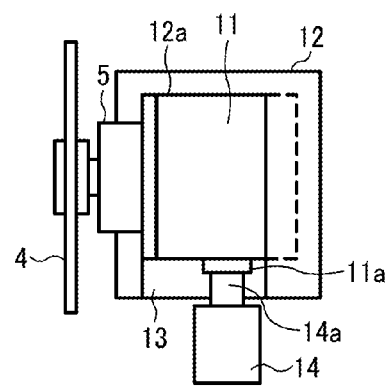
FIG. 3B is a schematic configuration of the wheel advancing and retreating mechanism when the phosphor wheel is positioned at the advanced position viewed from a direction perpendicular to the advancing and retreating direction of the phosphor wheel.
Figure 3C:
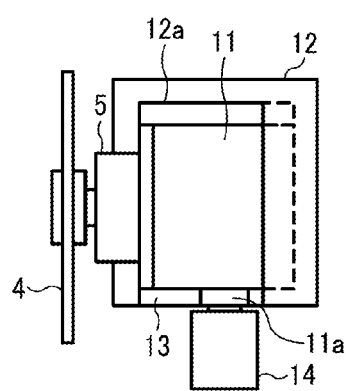
FIG. 3C is a schematic configuration of the wheel advancing and retreating mechanism when the phosphor wheel is positioned at the retreated position viewed from a direction perpendicular to the advancing and retreating direction of the phosphor wheel.

FIGS. 3A to 3C are schematic configuration of a wheel advancing and retreating mechanism 10, which is used as a rotatable member movement unit and a received light quantity reducing unit in the first example embodiment. Specifically, FIG. 3A is a schematic configuration of the wheel advancing and retreating mechanism 10 that advances and retreats the phosphor wheel 4, which is viewed from an advancing and retreating direction of the phosphor wheel 4. FIG. 3B is a schematic configuration of the wheel advancing and retreating mechanism 10 when the phosphor wheel 4 is positioned at an advanced position, which is viewed from a direction perpendicular to the advancing and retreating direction of the phosphor wheel 4. FIG. 3C is a schematic configuration of the wheel advancing and retreating mechanism 10 when the phosphor wheel 4 is positioned at a retreated position, which is viewed from a direction perpendicular to the advancing and retreating direction of the phosphor wheel 4.

As illustrated in FIG. 3B, when the phosphor wheel 4 is positioned at the advanced position, the phosphor wheel 4 is positioned on an optical path of blue light B. By contrast, as illustrated in FIG. 3C, when the phosphor wheel 4 is positioned at the retreated position, the phosphor wheel 4 is positioned at a position deviated from the optical path of blue light B, in which the blue light B is not irradiated onto the phosphor wheel 4 positioned at the retreated position.

As illustrated in FIG. 3A, the wheel advancing and retreating mechanism 10 includes, for example, a retaining member 11 having a cross-section shape of "L" to retain the motor 5. The retaining member 11 is supported by a base unit 12 of the wheel advancing and retreating mechanism 10. A guide rail 13 is formed on the base unit 12. A bottom face of the retaining member 11 is inserted into the guide rail 13, with which the retaining member 11 is slidably supported by the base unit 12. Further, a link unit 11a is formed on a part of the retaining member 11. The link unit 11a is connected to a plunger 14a of a solenoid 14 used as a driver of the retaining member 11.

The solenoid 14 is controlled by solenoid drive signal SD1 from the control unit 20. Specifically, when the motor 5 is rotating at a given speed or more, the control unit 20 stops current supply to the solenoid 14 (i.e., current-OFF). Under the current-OFF condition of the solenoid 14, the plunger 14a pushes the retaining member 11 to a positioning end 12a of the base unit 12 by using, for example, a biasing force of a spring disposed in the solenoid 14. With this configuration, the phosphor wheel 4 attached to the motor 5, retained on the retaining member 11, can be positioned at the advanced position as illustrated in FIG. 3B.

By contrast, when detecting that the rotation speed of the motor 5 becomes less than the given speed based on the rotation detection signal MX1, the control unit 20 turns ON the current-supply to the solenoid 14 (i.e., current-ON). Under the current-ON condition of the solenoid 14, the plunger 14a is pulled into the solenoid 14 by an attraction force, with which the plunger 14a retreats in a direction opposite to the biasing force of the spring. With this configuration, the retaining member 11 connected to the plunger 14a can be pulled by the plunger 14a, and the retaining member 11 slides along the guide rail 13 and moves in a discretion away from the positioning end 12a. With this configuration, the phosphor wheel 4 attached to the motor 5, retained on the retaining member 11, can be positioned at the retreated position as illustrated in FIG. 3C, with which the phosphor wheel 4 is deviated from an optical path of blue light B, and the blue light B is not irradiated onto the phosphor wheel 4.

FIG. 4 is a block diagram of the control unit 20. A central processing unit (CPU) 21 executes various computer programs to control the entire system based on control signal CTRL. A laser diode (LD) drive unit 22 generates and outputs LD drive signal IL1. A motor drive unit 23 generates and outputs motor drive signal MD1. A motor rotation detection unit 24 receives rotation detection signal MX1 of the motor 5 to detect whether the motor 5 is rotated at a given rotation speed. A synchronization signal generation unit 25 generates and outputs synchronization signal SYNC. A solenoid drive unit 26 generates and outputs solenoid drive signal SD1.

Signal LDC output from the CPU 21 is a data signal used for setting an output waveform of the LD drive signal IL1. When activating, the CPU 21 outputs the data signal LDC to the LD drive unit 22, and the LD drive unit 22 internally retains the data.

Further, signal MC1 output from the CPU 21 is a data signal used for setting a rotation speed of the motor 5. When activating, the CPU 21 outputs the signal MC1 to the motor drive unit 23, the synchronization signal generation unit 25, and the motor rotation detection unit 24, and then the motor drive unit 23, the synchronization signal generation unit 25, and the motor rotation detection unit 24 receives and internally retains the data in each of the units. When this data output is completed, the CPU 21 asserts signal MST1.

When the signal MST1 is asserted, the motor drive unit 23 generates and outputs the motor drive signal MD1. Based on the rotation speed data set by the signal MC1, the synchronization signal generation unit 25 internally generates a signal having a cycle same or substantially same as the rotation cycle of the motor 5. Further, when the rotation detection signal MX1 of the motor 5 is input to the synchronization signal generation unit 25, and signal SEL from the CPU 21, to be described later, is input to the synchronization signal generation unit 25, the synchronization signal generation unit 25 outputs one of the rotation detection signal MX1 and signal SEL as synchronization signal SYNC.

The motor rotation detection unit 24 detects or measures a cycle of the rotation detection signal MX1 of the motor 5, and compares the detected data with the rotation speed data corresponding to the retained signal MC1. Upon detecting a matching of the detected data and the rotation speed data, the motor rotation detection unit 24 asserts signal MGD1.

When the signal MGD1 is asserted, the CPU 21 asserts signal SEL. When the signal SEL is asserted, the synchronization signal generation unit 25 outputs the rotation detection signal MX1 of the motor 5 as the synchronization signal SYNC. Further, when the signal MGD1 is asserted, the CPU 21 asserts signal LDST. When the signal LDST is asserted, the LD drive unit 22 outputs the LD drive signal IL1 by synchronizing with the synchronization signal SYNC, wherein the LD drive signal IL1 is set with a waveform corresponding to waveform data of the signal LDC.

When the motor rotation detection unit 24 detects that the rotation speed of the motor 5 becomes lower than a given rotation speed corresponding to the rotation speed data of the retained signal MC1 based on the rotation detection signal MX1 of the motor 5, the motor rotation detection unit 24 negates the signal MGD1. Then, the CPU 21 negates the signal MST1, and stops an output of the motor drive signal MD1 of the motor 5 from the motor drive unit 23, and asserts solenoid control signal SOL. When the solenoid control signal SOL is asserted, the solenoid drive unit 26 outputs solenoid drive signal SD1. Then, current-supply to the solenoid 14 is turned ON to drive the solenoid 14, with which the phosphor wheel 4 is moved to the retreated position deviated from the optical path of blue light B. Further, the CPU 21 reports occurrence of abnormal rotation of the phosphor wheel 4 to an external apparatus and/or a user operation panel using signal CTRL as required.

Further, when the signal MGD1 is negated, the CPU 21 negates the signal SEL. Then, the synchronization signal generation unit 25 switches a synchronization signal, output from the synchronization signal generation unit 25, from the synchronization signal SYNC, which is generated from the rotation detection signal MX1 of the motor 5, to synchronization signal SYNC, which is generated from the rotation speed data of the signal MC1. Then, the LD drive unit 22 continues to output the LD drive signal IL1 by synchronizing with the switched synchronization signal SYNC.

FIG. 5 is a timing chart of an operation when the speed of the phosphor wheel 4 becomes a given rotation speed or more. FIG. 6 is a timing chart of an operation when the speed of the phosphor wheel 4 becomes less than the given rotation speed. In these timing charts, "T0" is a rotation cycle of the motor, "T2" is a half cycle period of the rotation cycle T0 of the motor. As to the first example embodiment, the phosphor wheel 4 outputs each light B, Y, G, and R for one time in T2 period, and outputs each light B, Y, G, and R for two times in T0 period as illustrated in FIG. 5. T1, T3, T4 and T5 are respectively an emission period of the blue light B, the yellow light Y, the green light G, and the red light R.

As to the first example embodiment, when abnormal rotation occurs to the motor 5, as above described, the synchronization signal SYNC is switched from the synchronization signal SYNC, generated from the rotation detection signal MX1 of the motor 5, to the synchronization signal SYNC, generated from the signal MC1, and the LD drive unit 22 continues to output the LD drive signal IL1 based on the switched synchronization signal SYNC. Therefore, the LD module 2 continues to output the blue light B.

In this case, the phosphor wheel 4 is retreated at a position deviated from the optical path of blue light B, with which the blue light B is not irradiated onto the phosphor wheel 4. When the phosphor wheel 4 is retreated at the position deviated from the optical path of blue light B, as illustrated in FIG. 6, the blue light B from the LD module 2 is continuously output to outside the light source device 1 through the third light condensing optical system 6C, the second reflection mirror 9B, the third relay lens 8C, the second dichroic mirror 7B, and the fourth relay lens 8D. Therefore, even if abnormal rotation occurs to the motor 5, the blue light B alone can be continuously output as an output light.

As to the first example embodiment, a value of the LD drive signal IL1 is changed for each of color light as illustrated in FIGS. 5 and 6, but the same value can be used for each of color light. Further, sequence of color, numbers of color, and types of color of light output from the light source device 1 is not limited to an example case of the first example embodiment.

Variant Example 1

Figure 7:
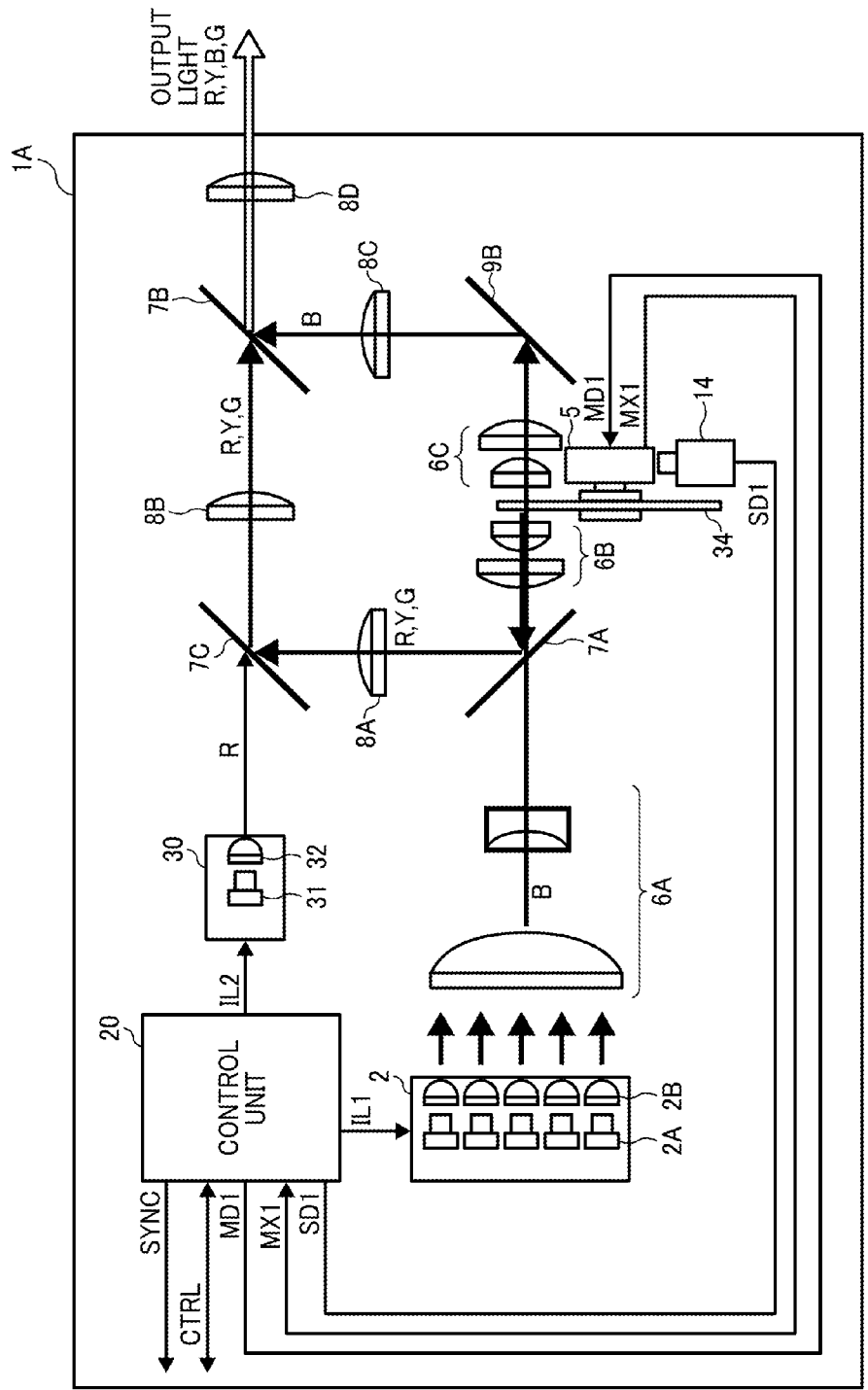
FIG. 7 is a schematic configuration of a light source device of variant example 1.

A description is given of one variant example of the light source device 1 of the first example embodiment (hereinafter, variant example 1). FIG. 7 is a schematic configuration of a light source device 1A of the variant example 1. Different from the light source device 1 of the above described first example embodiment, the light source device 1A is added with a LED module 30, and employs a third dichroic mirror 7C instead of the first reflection mirror 9A. Other configurations of the light source device 1A are same as the light source device 1 of the first example embodiment.

The LED module 30 includes, for example, a light emitting diode (LED) 31 used as other light source, a collimator lens 32, and a casing. The casing of the LED module 30 retains the LED 31 and the collimator lens 32 at desired positions, and dissipates heat generated from the LED 31 to suppress the temperature increase of the LED 31 within a given range, in which the casing of the LED 31 can function as a heat sink.

The LED 31 is driven by LD drive signal IL2, output from the control unit 20, and emits light having a wavelength range different from the blue light B emitted from the LD module 2. In the variant example 1, the LED 31 emits red light R but not limited hereto. The red light R emitted by the LED 31 is collimated by the collimator lens 32, and then enters the third dichroic mirror 7C.

Figure 8:
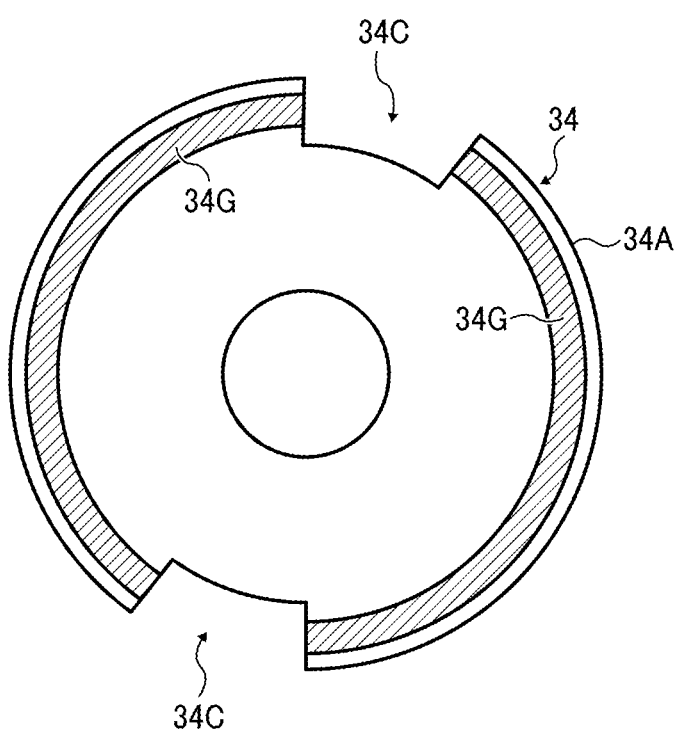
FIG. 8 is a front view of an example of a phosphor wheel of variant example 1.

FIG. 8 is a front view of a phosphor wheel 34 of the variant example 1. By adding the LED module 30 that can emit the red light R, the phosphor layer disposed on the phosphor wheel 34 can be configured with only a green phosphor layer 34G as illustrated in FIG. 8, wherein the green phosphor layer 34G can emit green light G having green wavelength range when irradiated with the blue light B having blue wavelength range.

Therefore, when outputting the red light R from the light source device 1A, the red light R can be emitted from the LED 31, with which the red phosphor layer 4R can be omitted. Further, when outputting the yellow light Y from the light source device 1a, the yellow light Y can be output by synthesizing the red light R emitted from the LED 31 and the green light G emitted from the green phosphor layer 34G on the phosphor wheel 34, with which the yellow phosphor layer 4Y can be emitted.

Figure 9:
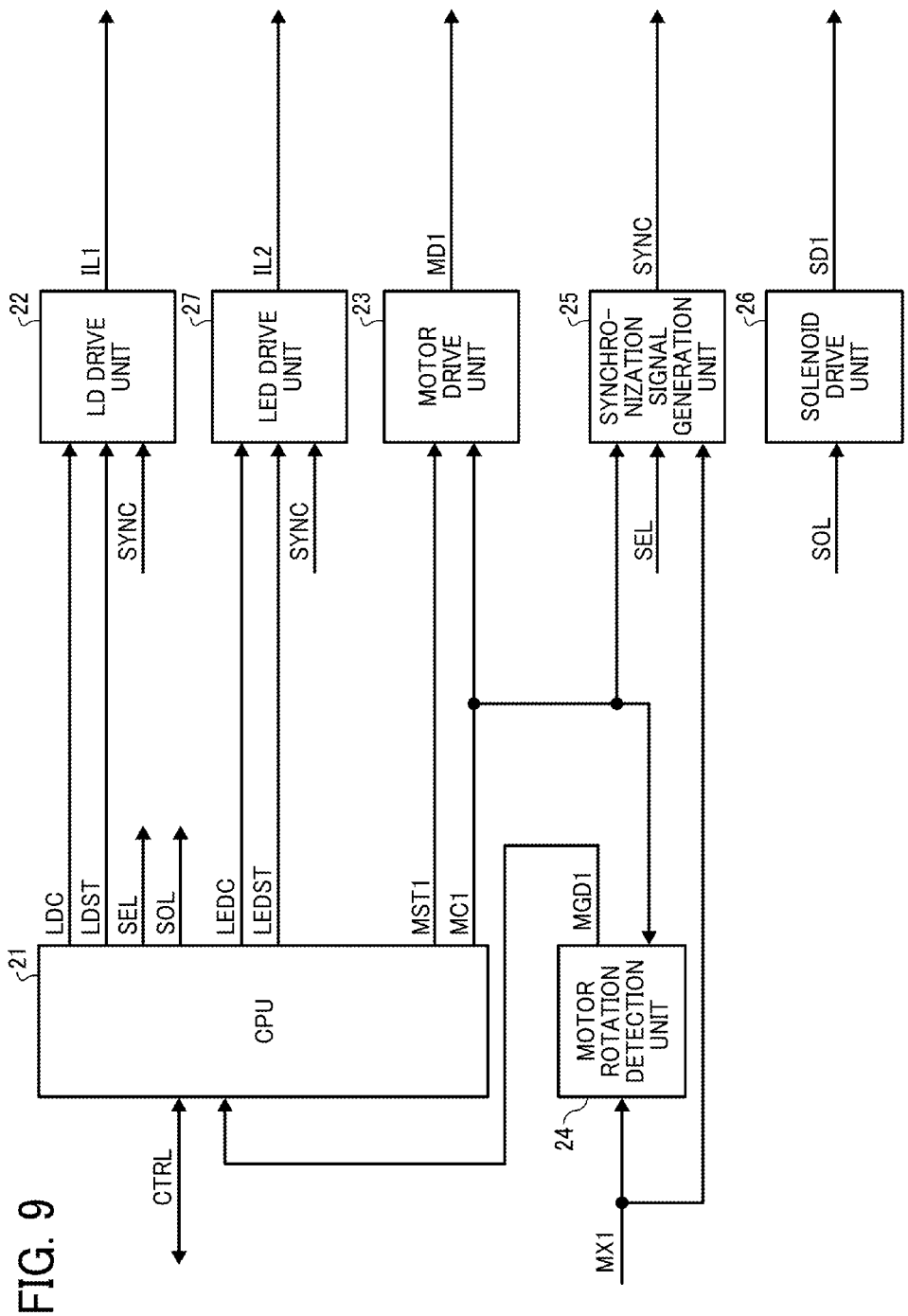
FIG. 9 is a block diagram of a control unit of variant example 1.

FIG. 9 is a block diagram of the control unit 20 of the variant example 1. Different from the control unit 20 of the above described first example embodiment, a LED drive unit 27 is added to the control unit 20 for the variant example 1. Other configurations of the control unit 20 of the variant example 1 are same as the control unit 20 of the light source device 1 of the above described first example embodiment.

The LED drive unit 27 generates and outputs the above mentioned LED drive signal IL2. Signal LEDC output from the CPU 21 is a data signal to set an output waveform of the LED drive signal IL2. When activating, the CPU 21 outputs the data signal LEDC to the LED drive unit 27, and the LED drive unit 27 internally retains the data. When the signal MGD1 is asserted, the CPU 21 asserts signal LEDST. Then, the LED drive unit 27 outputs the LED drive signal IL2 by synchronizing with the synchronization signal SYNC, wherein the LED drive signal IL2 is set with a waveform corresponding to waveform data of the signal LEDC.

Figure 10:
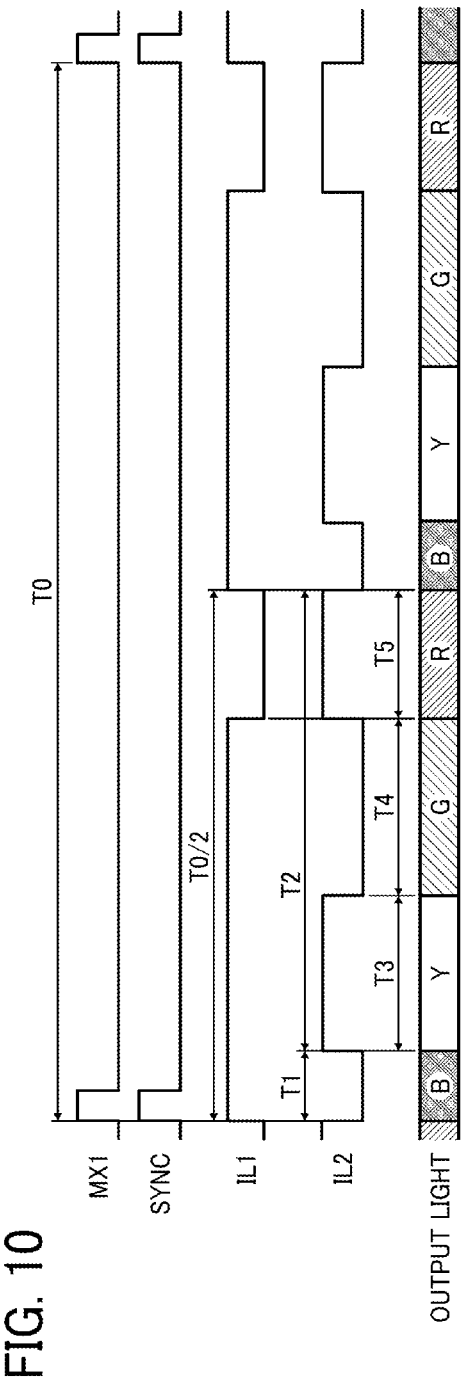
FIG. 10 is a timing chart of an operation when the speed of a phosphor wheel of variant example 1 becomes a given rotation speed or more.
Figure 11:
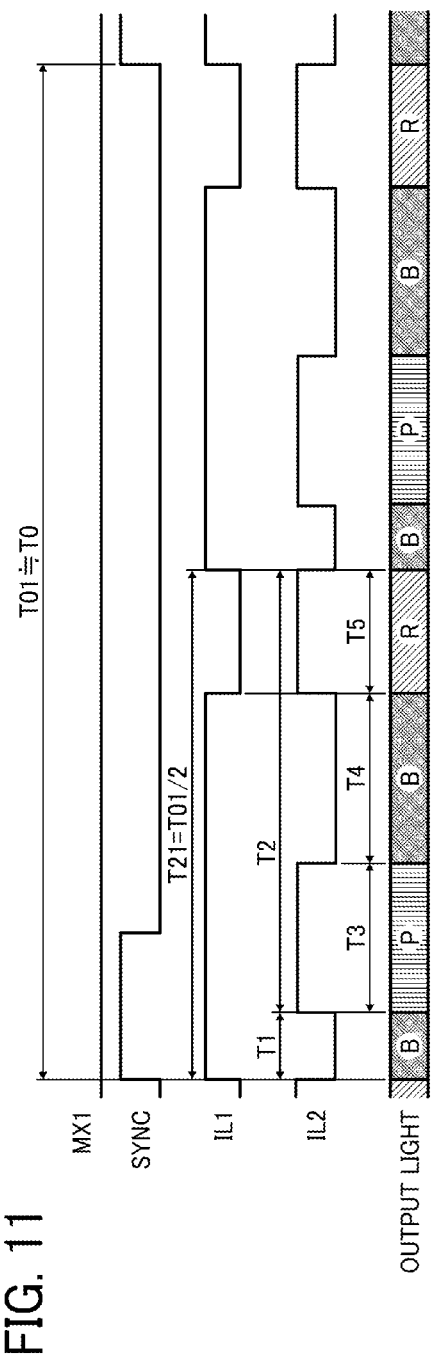
FIG. 11 is a timing chart of an operation when the speed of a phosphor wheel of variant example 1 becomes less than the given rotation speed.

FIG. 10 is a timing chart of an operation when the speed of the phosphor wheel 34 becomes a given rotation speed or more. FIG. 11 is a timing chart of an operation when the speed of the phosphor wheel 34 becomes less than the given rotation speed. As to the variant example 1, when abnormal rotation does not occur to the motor 5 and the phosphor wheel 34 normally rotates, as illustrated in FIG. 10, based on the LD drive signal IL1 output from the LD drive unit 22 and the LED drive signal IL2 output from the LED drive unit 27, the blue light B emitted from the LD module 2, the yellow light Y synthesized from the red light R emitted from the LED module 30 and the green light G emitted from the green phosphor layer 4G on the phosphor wheel 34, the green light G emitted from the green phosphor layer 4G on the phosphor wheel 34, and the red light R emitted from the LED module 30 are sequentially output from the same portion of the light source device 1A with a cycle corresponding to a half cycle of the rotating phosphor wheel 34.

By contrast, when abnormal rotation occurs to the motor 5, the phosphor wheel 34 is retreated to a position deviated from the optical path of blue light B, with which the blue light B is not irradiated onto the phosphor wheel 34. Further, as to the variant example 1, the synchronization signal SYNC is switched from the synchronization signal SYNC generated from the rotation detection signal MX1 of the motor 5 to the synchronization signal SYNC generated from the signal MC1. Based on the switched synchronization signal SYNC, the LD drive unit 22 continuously outputs the LD drive signal Ill, and the LED drive unit 27 continuously outputs the LED drive signal IL2. Therefore, the blue light B is emitted intermittently from the LD module 2 in line with the LD drive signal IL1 as illustrated in FIG. 11, and the red light R is emitted intermittently from the LED module 30 in line with the LED drive signal IL2 as illustrated in FIG. 11. Therefore, as illustrated in FIG. 11, the blue light B emitted from the LD module 2, purple light P synthesized from the red light R of the LED module 30 and the blue light B emitted from the LD module 2, the blue light B emitted from the LD module 2, and the red light R emitted from the LED module 30 are continuously output as an output light with a given cycle.

Second Example Embodiment

Figure 12:
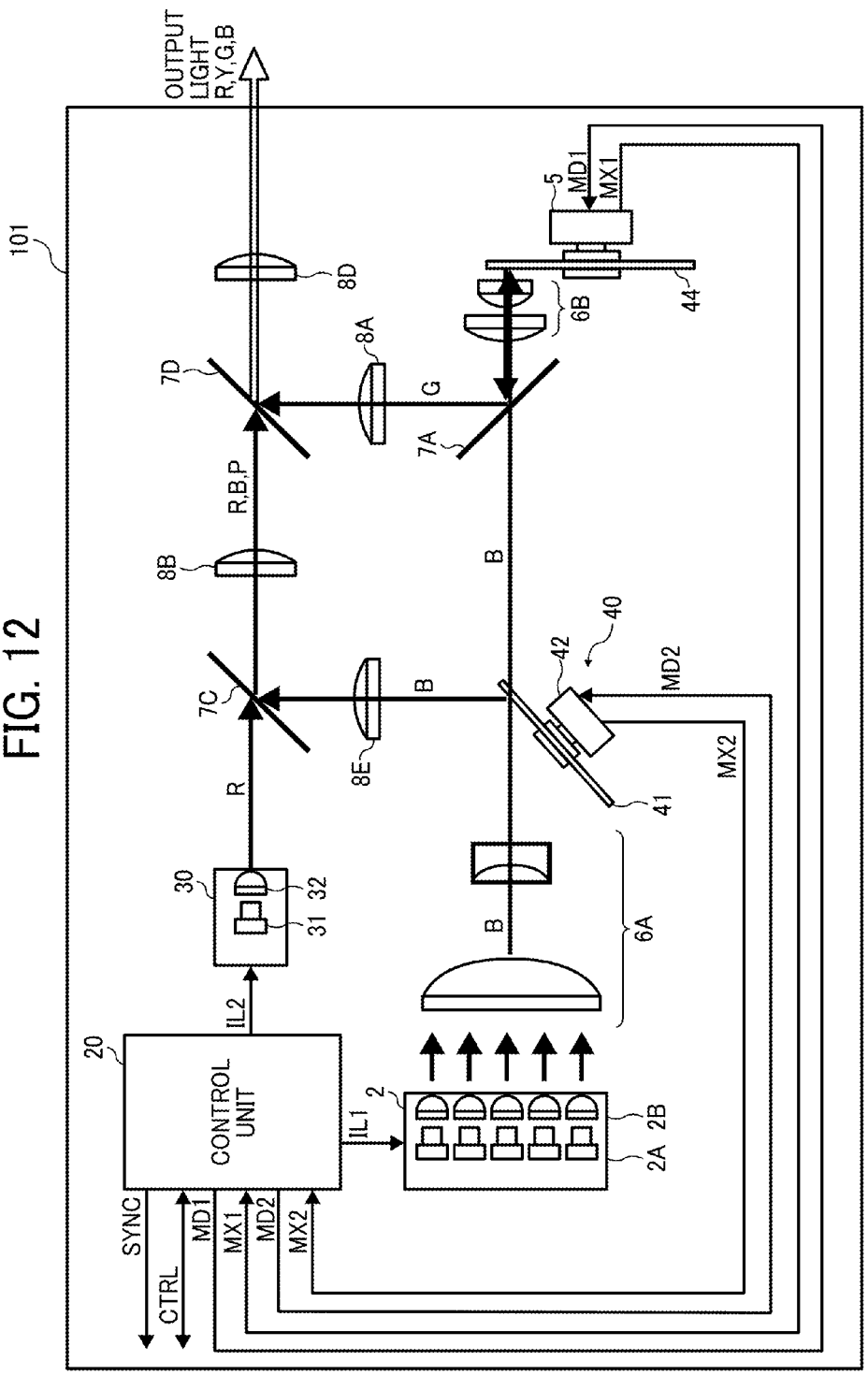
FIG. 12 is a schematic configuration of a light source device according to a second example embodiment.

A description is given of a light source device 101 according to a second example embodiment different from the above described first example embodiment. FIG. 12 is a schematic configuration of the light source device 101 of the second example embodiment. Different from the light source device 1A of the variant example 1 of the above described first example embodiment, the light source device 101 of the second example embodiment includes an optical path switching unit such as an optical path switching unit 40 including a mirror wheel 41, and a motor 42 that drives a rotation of the mirror wheel 41. Other configurations of the light source device 101 are substantially same as the light source device 1A of the variant example 1.

Figure 13:
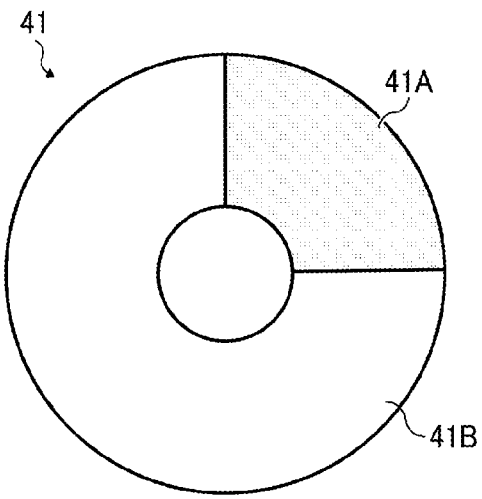
FIG. 13 is a front view of an example of a mirror wheel of the light source device of FIG. 12.

As illustrated in FIG. 13, for example, the mirror wheel 41 is composed of a disk having two areas such as a first area 41A and a second area 41B. As to the second example embodiment, the first area 41A is used as a reflection area 41A that reflects incident light, and the second area 41B is used as a light passing area that allows incident light to pass through but not limited hereto. The mirror wheel 41 can be made of, for example, a translucent glass plate having formed with a layer made of high reflectance material such as aluminum on only the first area 41A with reduced cost.

Figure 14:
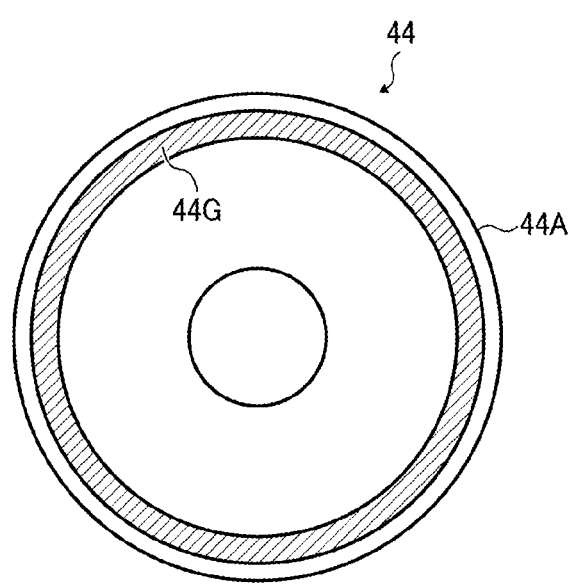
FIG. 14 is a front view of an example of a phosphor wheel of the light source device of FIG. 12.

FIG. 14 is a front view of a phosphor wheel 44 of the second example embodiment. As same as the above variant example 1, the LED module 30 that can emit the red light R is included for the second example embodiment. Therefore, as illustrated in FIG. 14, the phosphor layer disposed on the phosphor wheel 44 of the second example embodiment can be configured only with a green phosphor layer 44G that can emit green light G having green wavelength range when blue light B having blue wavelength range is irradiated onto the green phosphor layer 44G. Further, as to the second example embodiment, the mirror wheel 41 is disposed on the optical path of blue light B, which extends from the LD module 2 to the phosphor wheel 44.

In this configuration, when outputting the blue light B from the light source device 101, it is not required to guide the blue light B to pass through the phosphor wheel 44. Therefore, as to the second example embodiment, a light passing portion is not required for the phosphor wheel 44 while the phosphor wheel 34 of the above described variant example 1 includes the light passing portion 34C.

Further, as to the second example embodiment, the mirror wheel 41 is disposed on the optical path of blue light B, which extends from the LD module 2 to the phosphor wheel 44, with which irradiation of the blue light B to the phosphor wheel 44 can be blocked as required. Therefore, as to the second example embodiment, the wheel advancing and retreating mechanism 10 that retreats the phosphor wheel 44 at a position deviated from the optical path of blue light B is not required.

Figure 15:
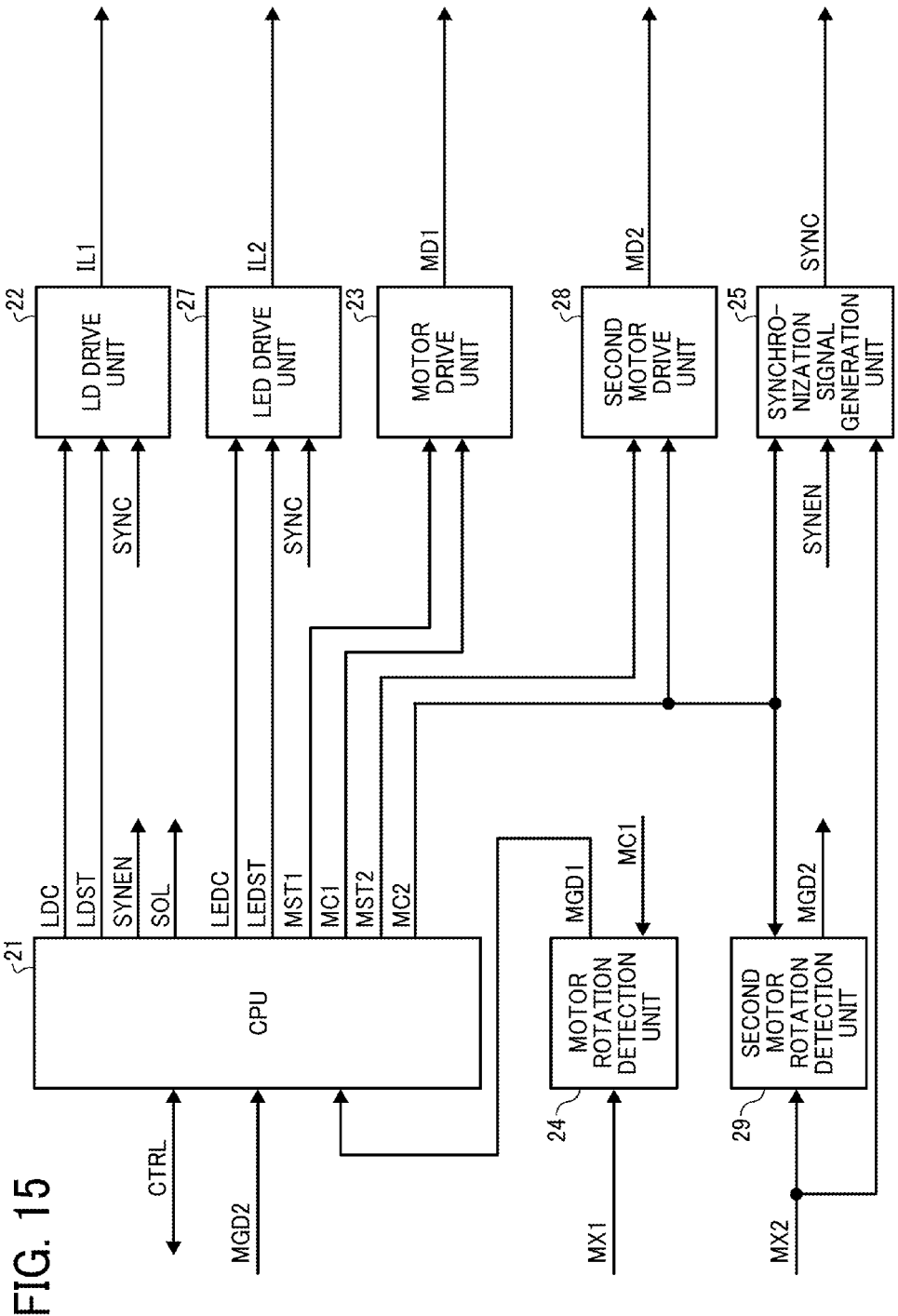
FIG. 15 is a block diagram of a control unit of the second example embodiment.

FIG. 15 is a block diagram of the control unit 20 of the second example embodiment. Because the wheel advancing and retreating mechanism 10 is not required for the second example embodiment as above described, the control unit 20 does not include the solenoid drive unit 26. Instead, the control unit 20 of the second example embodiment is added with a second motor drive unit 28 and a second motor rotation detection unit 29.

The second motor drive unit 28 generates and outputs motor drive signal MD2 to control driving of the motor 42 that drives a rotation of the mirror wheel 41. The second motor rotation detection unit 29 receives rotation detection signal MX2 of the motor 42, and detects whether the speed of the motor 42 is at a given rotation speed. Further, an input signal, input to the synchronization signal generation unit 25, is changed from MX1 to MX2, and further, a control signal input to the synchronization signal generation unit 25 from the CPU 21 is changed from SEL to SYNEN.

When activated by the control signal CTRL, the control unit 20 of the CPU 21 outputs the motor drive signal MD2 from the second motor drive unit 28 to drive the motor 42. The mirror wheel 41 (FIG. 13) is attached to the rotation axis such as a shaft of the motor 42. By rotating the mirror wheel 41, blue light B emitted from the LD module 2 can be switched between a passing mode and a reflection mode time-divisionally. Further, the motor 42 is disposed with a detector in or outside of the motor 42 to detect the rotation condition, and the detector outputs the rotation detection signal MX2.

The control unit 20 receives the rotation detection signal MX1 of the motor 5, and the rotation detection signal MX2 of the motor 42 to detect the rotation condition of the motor 5 and the motor 42 respectively. Upon detecting that both of the motor 5 and the motor 42 become a given rotation speed, the control unit 20 generates and outputs signal SYNC synchronized to the rotation cycle of the motor 42, outputs the LD drive signal IL1 to the LD module 2 to drive the LD 2A in the LD module 2, and also outputs the LED drive signal IL2 to the LED module 30 to drive the LED 31 in the LED module 30.

As to the second example embodiment, the optical path of blue light B, emitted from the LD module 2 and then passing the first light condensing optical system 6A can be time-divisionally switched between a first optical path, which guides the blue light B to the phosphor wheel 44, and a second optical path, which guides the blue light B to the third dichroic mirror 7C by using the optical path switching unit 40. Therefore, when the optical path of blue light B is switched from the first optical path that guides the blue light B to the phosphor wheel 44 to the second optical path, the blue light B such as blue laser beam is not irradiated onto the phosphor wheel 44.

Signal MC2 output from the CPU 21 is a data signal used for setting the rotation speed of the motor 42. When activating, the CPU 21 outputs the concerned data to the second motor drive unit 28, the synchronization signal generation unit 25, and the second motor rotation detection unit 29, and then the second motor drive unit 28, the synchronization signal generation unit 25, and the second motor rotation detection unit 29 receive the data and internally retain the data.

When completing this data output, the CPU 21 asserts signal MST2. When the signal MST2 is asserted, the second motor drive unit 28 generates and outputs drive signal MD2 based on the rotation speed data of the motor 42.

The synchronization signal generation unit 25 internally generates a signal having a cycle same or substantially same as the rotation cycle of the motor 42 based on the rotation speed data.

Further, when the rotation detection signal MX2 of the motor 42 is input to the synchronization signal generation unit 25, and signal SYNEN from the CPU 21 is input to the synchronization signal generation unit 25, the synchronization signal generation unit 25 outputs one of the rotation detection signal MX2 and signal SYNEN as synchronization signal SYNC.

The second motor rotation detection unit 29 detects or measures a cycle of the rotation detection signal MX2 of the motor 42, and compares the detected data with the rotation speed data corresponding to the retained signal MC2. Upon detecting the matching of the detected data and the retained rotation speed data, the second motor rotation detection unit 29 asserts signal MGD2. When the signal MGD1 and MGD2 are both asserted, the CPU 21 asserts signal SYNEN. When the signal SYNEN is asserted, the synchronization signal generation unit 25 outputs the rotation detection signal MX2 of the motor 42 as the synchronization signal SYNC.

FIG. 16 is a timing chart of an operation when the speed of the phosphor wheel 44 becomes a given rotation speed or more. FIG. 17 is a timing chart of an operation when the speed of the phosphor wheel 44 becomes less than the given rotation speed. As to the second example embodiment, when abnormal rotation does not occur to the motor 5 and the phosphor wheel 44 normally rotates, as illustrated in FIG. 16, based on the LD drive signal IL1 output from the LD drive unit 22 and the LED drive signal IL2 output from the LED drive unit 27, with a cycle corresponding to a half cycle of the rotating mirror wheel 41, the blue light B emitted from the LD module 2, the yellow light Y synthesized from the red light R emitted from the LED module 30 and the green light G emitted from the green phosphor layer 44G on the phosphor wheel 44, the green light G emitted from the green phosphor layer 44G on the phosphor wheel 44, and the red light R emitted from the LED module 30 are sequentially output from the same portion of the light source device 101.

Specifically, in a case of FIG. 16, during T1 period outputting the blue light B from the light source device 101, the blue light B emitted from the LD module 2 reflects on the first area 41A (reflection area 41A) of the mirror wheel 41, and is then guided to the second optical path. Then, the blue light B reflects at the third dichroic mirror 7C, and is then guided to a fourth dichroic mirror 7D via the second relay lens 8B. The fourth dichroic mirror 7D reflects green light G having green wavelength range, and passes light having other wavelength range. Therefore, the blue light B guided to the fourth dichroic mirror 7D passes through the fourth dichroic mirror 7D, and is output to outside the light source device 101 through the fourth relay lens 8D.

Further, during T3 period outputting the yellow light Y from the light source device 101, the blue light B emitted from the LD module 2 passes through the second area 41B (light passing area 41B) of the mirror wheel 41, and is then guided to the first optical path. With this configuration, the blue light B passing the first dichroic mirror 7A is irradiated onto the phosphor wheel 44, and the green light G is emitted from the green phosphor layer 44G disposed on the phosphor wheel 44. The green light G reflects at the first dichroic mirror 7A, and further reflects at the fourth dichroic mirror 7D, and is then guided to the fourth relay lens 8D. Further, during T3 period outputting the yellow light Y from the light source device 1, the red light R is emitted from the LED module 30. The red light R emitted from the LED module 30 passes through the third dichroic mirror 7C, and is then guided to the fourth dichroic mirror 7D through the second relay lens 8B, and passes through the fourth dichroic mirror 7D. Therefore, the yellow light Y synthesized from the green light G and the red light R is output from the light source device 101.

Further, during T4 period outputting the green light G from the light source device 101, the blue light B emitted from the LD module 2 passes through the second area 41B (light passing area 41B) of the mirror wheel 41, and is then guided to the first optical path. With this configuration, the blue light B passing the first dichroic mirror 7A is irradiated onto the phosphor wheel 44, and the green light G is emitted from the green phosphor layer 44G disposed on the phosphor wheel 44. The green light G reflects at the first dichroic mirror 7A, and further reflects at the fourth dichroic mirror 7D, and is then guided to the fourth relay lens 8D. Further, during T4 period, emission of the red light R from the LED module 30 is stopped. Therefore, the light source device 101 outputs the green light G.

Further, during T5 period outputting the red light R from the light source device 101, the red light R is emitted from the LED module 30. The red light R emitted from the LED module 30 passes through the third dichroic mirror 7C, and is then guided to the fourth dichroic mirror 7D through the second relay lens 8B, and the passes through the fourth dichroic mirror 7D. Further, during T5 period, emission of blue light B from the LD module 2 is stopped. Therefore, the light source device 101 outputs the red light R.

When abnormal rotation occurs to the motor 5, the motor rotation detection unit 24 detects that the rotation speed of the motor 5 becomes lower than the rotation speed retained in the motor rotation detection unit 24. Then, signal MGD1 is negated, and the CPU 21 negates the signal MST1. Then, an output of the motor drive signal MD1 of the motor 5 is stopped, and the CPU 21 outputs waveform data that stops an output of the LD drive signal IL1 to the LD drive unit 22 during a period when the optical path switching unit 40 switches the optical path of blue light B to the first optical path (see FIG. 17). The LD drive unit 22 nullifies or cancels the previous waveform data, and retains newly received waveform data. Then, the LD drive signal IL1 having a waveform based on this new waveform data is output by synchronizing with the synchronization signal SYNC.

Therefore, during T3 period, T4 period, and T5 period in FIG. 17 that the optical path switching unit 40 switches the optical path of blue light B to the first optical path, an emission of the blue light B from the LD module 2 is stopped, and the blue light B is not irradiated onto the phosphor wheel 44. During T3 period, T4 period, and T5 period, the red light R is emitted intermittently from the LED module 30 based on the LED drive signal IL2 as illustrated in FIG. 17. Therefore, as illustrated in FIG. 17, during T4 period, an output of light from the light source device 101 is stopped while the red light R emitted from the LED module 30 is output during T3 period and T5 period.

Further, during T1 period when the optical path switching unit 40 switches the optical path of blue light B to the second optical path, the blue light B is emitted from the LD module 2, and then the blue light B reflects at the first area 41A (reflection area 41A) of the mirror wheel 41, and is guided to the second optical path, with which the blue light B is not irradiated onto the phosphor wheel 44. Therefore, during T1 period, the blue light B is output from the light source device 101.

As to the second example embodiment, when abnormal rotation occurs to the motor 5, the rotation of the mirror wheel 41 is continued, and LD drive signal that drives the LD module 2 is changed so that the blue light B is not irradiated onto the phosphor wheel 44.

Instead of this configuration, other configuration can be employed. For example, when abnormal rotation occurs to the motor 5, the motor 42 is controlled to stop the rotation of the mirror wheel 41 so that the first area 41A (reflection area 41A) of the mirror wheel 41 exists on the optical path of blue light B extending from the LD module 2. In this case, by reducing light quantity emitted from the LD module 2 by using the control unit 20 as a light source light quantity reducing unit, unnecessary power consumption can be reduced.

Further, as above described, the optical path switching unit 40 is configured with the mirror wheel 41 and the motor 42. The mirror wheel 41 includes the second area 41B (light passing area 41B) that passes incident light, and the first area 41A (reflection area 41A) that reflects incident light, and the mirror wheel 41 is used as an optical path switching member. The motor 42 is used as a drive unit for driving the optical path switching member. The motor 42 drives rotation of the mirror wheel 41 so that one of the second area 41B (light passing area 41B) and the first area 41A (reflection area 41A) exists on the optical path of the blue light B from the LD module 2. However, the optical path switching unit 40 is not limited hereto. For example, the optical path switching unit 40 can be configured as a switching diffraction grating that switches an optical path of light by passing or reflecting pluralization light depending on voltage applied to the switching diffraction grating.

Variant Example 2

Figure 18:
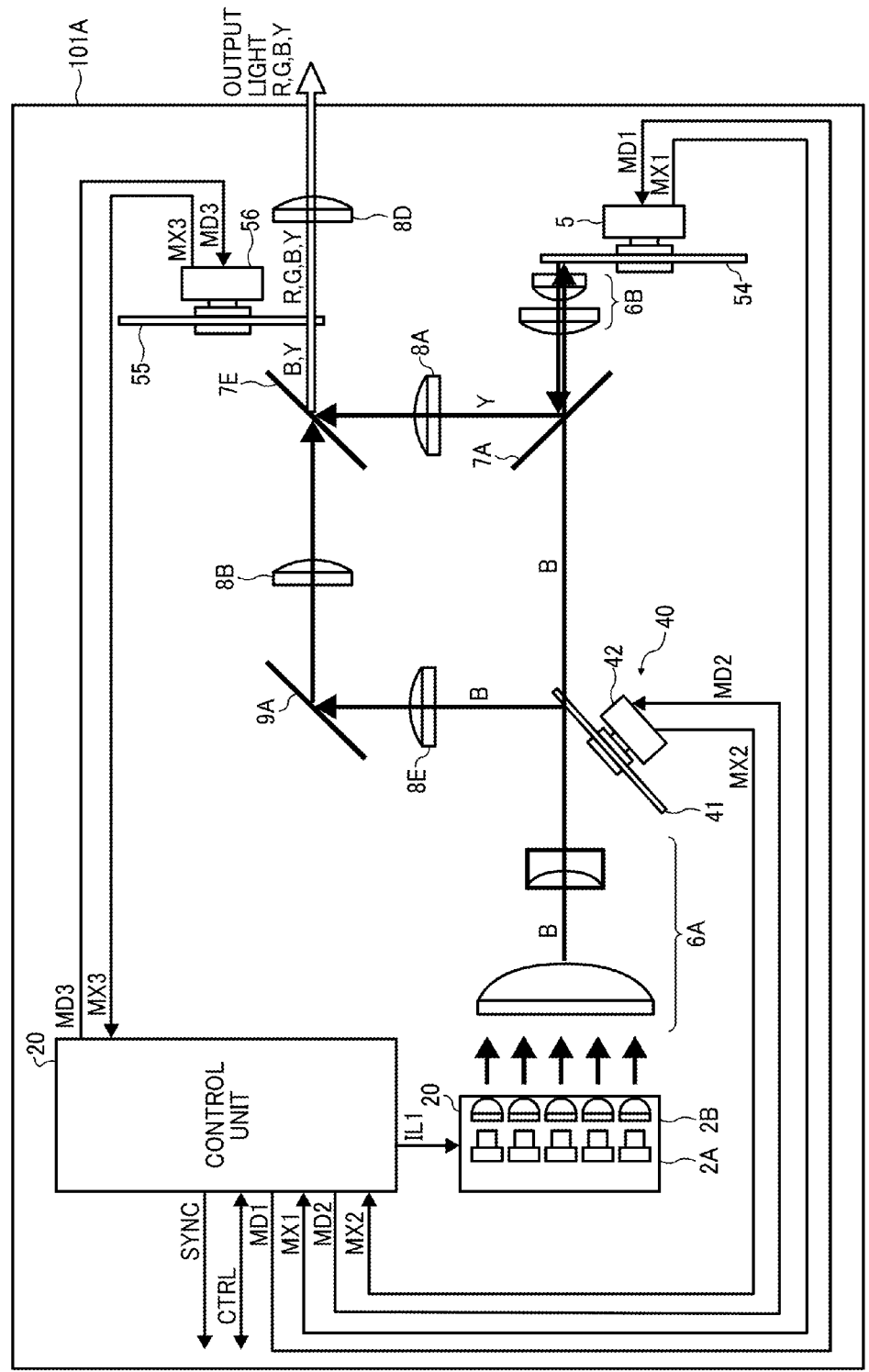
FIG. 18 is a schematic configuration of a light source device of variant example 2.

A description is given of one variant example of a light source device of the second example embodiment (herein-after, variant example 2). FIG. 18 is a schematic configuration of a light source device 101A of the variant example 2. Different from the light source device 101 of the above described second example embodiment, the light source device 101A of the variant example 2 removes the LED module 30 that emits the red light R while employing a yellow phosphor layer 54Y that can emit yellow light Y having yellow wavelength range when blue light B having blue wavelength range is irradiated instead of the green phosphor layer 44G disposed on the phosphor wheel 44, and employing a color wheel 55 that can separate yellow light Y emitted from a phosphor wheel 54 into red light and green light. Other configurations of the light source device 101A of the variant example 2 are same as the light source device 101 of the second example embodiment.

Figure 19:
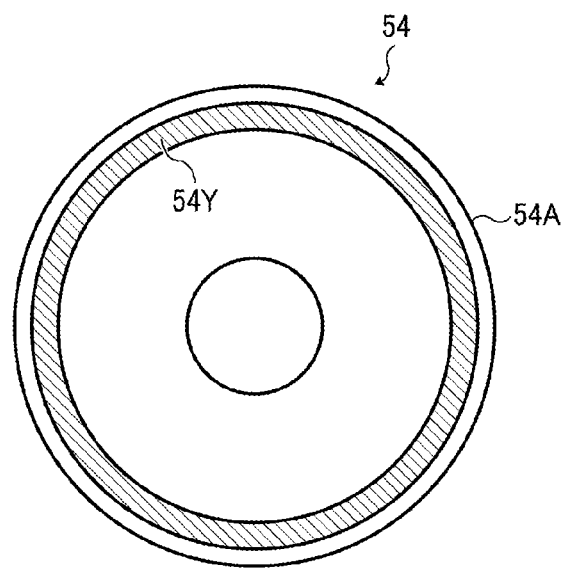
FIG. 19 is a front view of an example of a phosphor wheel of variant example 2.

FIG. 19 is a front view of a phosphor wheel 54 of the variant example 2. As illustrated in FIG. 19, a phosphor layer disposed on the phosphor wheel 54 is configured with only a yellow phosphor layer 54Y that emits yellow light Y having yellow wavelength range when blue light B having blue wavelength range is irradiated. Further, the mirror wheel 41 disposed on the optical path of blue light B, which extends from the LD module 2 to the phosphor wheel 54, with which irradiation of the blue light B to the phosphor wheel 54 can be blocked as required. Therefore, as to the variant example 2, the wheel advancing and retreating mechanism 10 that retreats the phosphor wheel 54 at a position deviated from the optical path of blue light B is not required.

Figure 20:
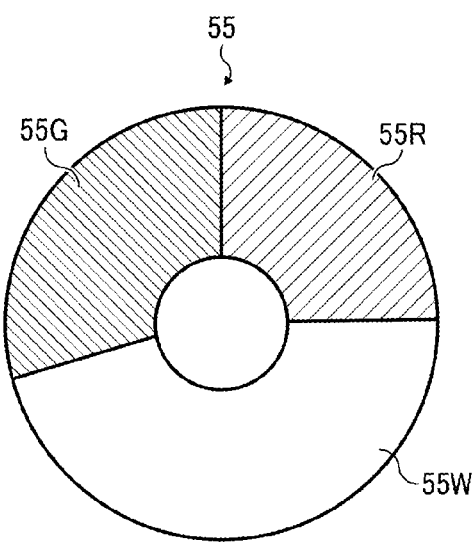
FIG. 20 is a front view of an example of a color wheel of variant example 2.

FIG. 20 is a front view of the color wheel 55 of the variant example 2. The color wheel 55 used for the variant example 2 is a disk including a red light passing area 55R, a green light passing area 55G, and a translucent area 55W. The red light passing area 55R passes only red light having red wavelength range. The green light passing area 55G passes only green light having green wavelength range. The translucent area 55W passes light as it is. The red light passing area 55R is composed of a filter that passes only red light having red wavelength range of incident light, and reflects or absorbs other light component. The green light passing area 55G is composed of a filter that passes only the green light having green wavelength range, and reflects or absorbs other light component.

Figure 21:
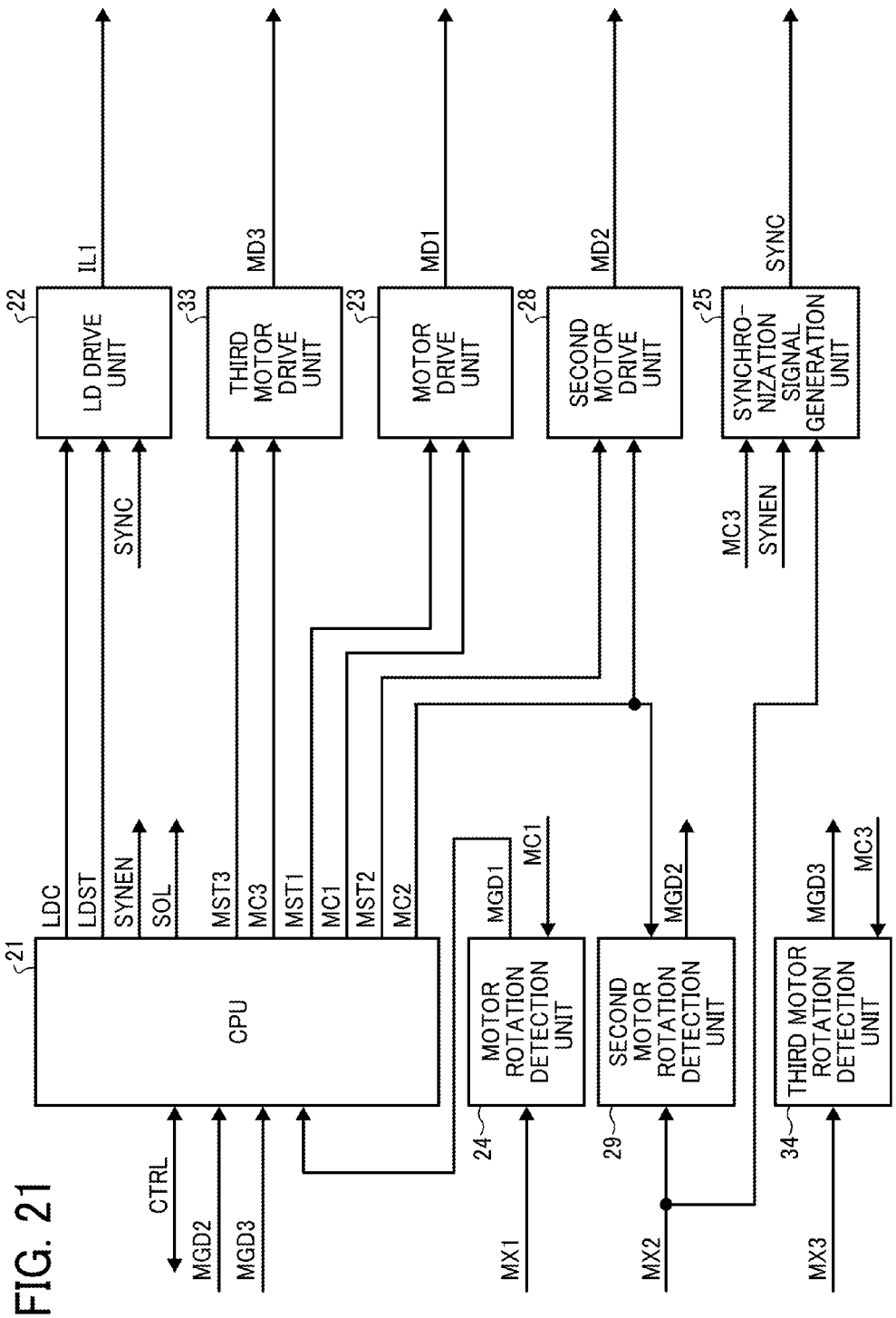
FIG. 21 is a block diagram of a control unit of variant example 2.

FIG. 21 is a block diagram of the control unit 20 of the variant example 2. As to the variant example 2, because the LED module 30 that emits the red light R is removed as above described, the LED drive unit 27 for the LED module 30 does not exist. Instead of the LED module 30 and the LED drive unit 27, the control unit 20 of the variant example 2 includes a third motor drive unit 33, and a third motor rotation detection unit 34. The third motor drive unit 33 generates and outputs motor drive signal MD3 used for controlling a motor 56 that drives a rotation of the color wheel 55. The third motor rotation detection unit 34 receives rotation detection signal MX3 of the motor 56, and detects whether the motor 56 becomes a given rotation speed.

When activated by control signal CTRL, the CPU 21 of the control unit 20 outputs the motor drive signal MD2 and the motor drive signal MD3 so that the second motor drive unit 28 drives the motor 42, and the third motor drive unit 33 drives the motor 56. Because the motor 42 and the motor 56 are driven with synchronizing manner, the mirror wheel 41 rotated by the motor 42, and the color wheel 55 rotated by the motor 56 rotate with synchronizing manner with each other.

The mirror wheel 41 (FIG. 13) is attached to a rotation axis such as a shaft of the motor 42. By rotating the mirror wheel 41, blue light B emitted from the LD module 2 can be switched between a passing mode and a reflection mode time-divisionally. Further, the motor 42 is disposed with a detector in or outside of the motor 42 to detect the rotation condition, and the detector outputs the rotation detection signal MX2.

The color wheel 55 (FIG. 20) is attached to a rotation axis such as a shaft of the motor 56. By rotating the color wheel 55, light coming the fifth dichroic mirror 7E can be switched to pass through one of the three areas of 55R, 55G, and 55W time-divisionally. Further, the motor 56 is disposed with a detector in or outside of the motor 56 to detect the rotation condition, and the detector outputs the rotation detection signal MX3.

The control unit 20 receives the rotation detection signals MX1, MX2, MX3 of the respective motors 5, 42, 56 to detect rotation condition of each of the motors 5, 42, 56. Upon detecting that each one of the motors 5, 42, 56 becomes a given rotation speed, the control unit 20 generates and outputs signal SYNC synchronized to the rotation cycle of the motor 42, and outputs the LD drive signal IL1 to the LD module 2 to drive the LD 2A on the LD module 2.

As to the variant example 2, the optical path of blue light B, emitted from the LD module 2 and passing the first light condensing optical system 6A, can be guided to a first optical path and a second optical path by the optical path switching unit 40. As to the first optical path, the light is guided to the phosphor wheel 54 by the optical path switching unit 40. As to the second optical path, the light is guided to the first reflection mirror 9A by the optical path switching unit 40. Therefore, as to the variant example 2, the optical path of blue light B can be switched between the first optical path and the second optical path time-divisionally. As to the variant example 2, by switching the optical path of blue light B from the first optical path guided to the phosphor wheel 54 to the second optical path, the blue light B is not irradiated onto the phosphor wheel 54.

Signal MC3 output from the CPU 21 is data signal used for setting the rotation speed of the motor 56. When activating, the CPU 21 outputs the concerned data to the third motor drive unit 33, the synchronization signal generation unit 25, and the third motor rotation detection unit 34, and the third motor drive unit 33, the synchronization signal generation unit 25, and the third motor rotation detection unit 34 receive the data and internally retain the data.

When this data outputting completes, the CPU 21 asserts signal MST3. When the signal MST3 is asserted, the third motor drive unit 33 generates and outputs drive signal MD3 based on rotation speed data of the motor 56.

The third motor rotation detection unit 34 detects or measures a cycle of the rotation detection signal MX3 of the motor 56, and compares the detected data with the rotation speed data corresponding to the retained signal MC3. Upon detecting the matching of the detected data and the retained rotation speed data, the third motor rotation detection unit 34 asserts signal MGD3. When the signals MGD1, MGD2, and MGD3 are all asserted, the CPU 21 asserts signal SYNEN. When the signal SYNEN is asserted, the synchronization signal generation unit 25 outputs the rotation detection signal MX2 of the motor 42 as the synchronization signal SYNC.

FIG. 22 is a timing chart of an operation when the speed of the phosphor wheel 54 becomes a given rotation speed or more. FIG. 23 is a timing chart of an operation when the speed of the phosphor wheel 54 becomes less than the given rotation speed. As to the variant example 2, when abnormal rotation does not occur to the motor 5 and the phosphor wheel 54 normally rotates, as illustrated in FIG. 22, based on the LD drive signal IL1 output from the LD drive unit 22, with a cycle corresponding to a half cycle of the rotating mirror wheel 41, the blue light B emitted from the LD module 2, the yellow light Y emitted from the yellow phosphor layer 54Y on the phosphor wheel 54, the red light R extracted from the yellow light Y emitted from the yellow phosphor layer 54Y on the phosphor wheel 54, and the green light G extracted from the yellow light Y emitted from the yellow phosphor layer 54Y on the phosphor wheel 54 are sequentially output from the same portion of the light source device 101A.

Specifically, in a case of FIG. 22, during T1 period outputting the blue light B from the light source device 101A, the blue light B emitted from the LD module 2 reflects on the first area 41A (reflection area 41A) of the mirror wheel 41, and is then guided to the second optical path. Then, the blue light B reflects at the first reflection mirror 9A, and is then guided to a fifth dichroic mirror 7E through the second relay lens 8B. The fifth dichroic mirror 7E reflects the yellow light Y having yellow wavelength range, and passes light having other wavelength range. Therefore, the blue light B guided to the fifth dichroic mirror 7E passes through the fifth dichroic mirror 7E, and is then guided to the color wheel 55. The blue light B guided to the color wheel 55 passes through the translucent area 55W, and is output to outside the light source device 101A through the fourth relay lens 8D.

Further, during T3 period outputting the yellow light Y from the light source device 101A, the blue light B emitted from the LD module 2 passes through the second area 41B (light passing area 41B) of the mirror wheel 41, and is then guided to the first optical path. With this configuration, the blue light B passes through the first dichroic mirror 7A and is irradiated onto the phosphor wheel 54, with which the yellow light Y is emitted from the yellow phosphor layer 54Y on the phosphor wheel 54. The yellow light Y reflects at the first dichroic mirror 7A, and further reflects at the fifth dichroic mirror 7E, and is then guided to the color wheel 55. The yellow light Y guided to the color wheel 55 passes through the translucent area 55W of the color wheel 55, and is output to outside the light source device 101A through the fourth relay lens 8D.

Further, during T4 period outputting the green light G from the light source device 101A, the blue light B emitted from the LD module 2 passes through the second area 41B (light passing area 41B) of the mirror wheel 41, and is then guided to the first optical path. Then, the blue light B passes through the first dichroic mirror 7A and is irradiated onto the phosphor wheel 54, with which the yellow light Y is emitted from the yellow phosphor layer 54Y on the phosphor wheel 54. The yellow light Y reflects at the first dichroic mirror 7A, and further reflects at the fifth dichroic mirror 7E, and is then guided to the color wheel 55. In this case, the yellow light Y guided to the color wheel 55 passes through the green light passing area 55G of the color wheel 55. With this configuration, the green light G included in the yellow light Y is output from the color wheel 55, and the green light G is output to outside the light source device 1 through the fourth relay lens 8D.

Further, during T5 period outputting the red light R from the light source device 101A, the blue light B emitted from the LD module 2 passes through the second area 41B (light passing area 41B) of the mirror wheel 41, and is then guided to the first optical path. Then, the blue light B passes through the first dichroic mirror 7A and is irradiated onto the phosphor wheel 54, with which the yellow light Y is emitted from the yellow phosphor layer 54Y on the phosphor wheel 54. The yellow light Y reflects at the first dichroic mirror 7A, and further reflects at the fifth dichroic mirror 7E, and is then guided to the color wheel 55. In this case, the yellow light Y guided to the color wheel 55 passes through the red light passing area 55R of the color wheel 55. With this configuration, the red light R included in the yellow light Y is output from the color wheel 55, and the red light R is output to outside the light source device 1 through the fourth relay lens 8D.

When abnormal rotation occurs to the motor 5, the motor rotation detection unit 24 detects that the rotation speed of the motor 5 becomes lower than the rotation speed retained in the motor rotation detection unit 24. Then, signal MGD1 is negated, and the CPU 21 negates the signal MST1. Then, an output of the motor drive signal MD1 of the motor 5 is stopped, and the CPU 21 outputs waveform data that stops an output of the LD drive signal IL1 to the LD drive unit 22 during a period when the optical path switching unit 40 switches the optical path of blue light B to the first optical path (see FIG. 23). The LD drive unit 22 nullifies or cancels the previous waveform data, and retains newly received waveform data. Then, the LD drive signal IL1 having a waveform based on this new waveform data is output by synchronizing with the synchronization signal SYNC.

Therefore, during T3 period, T4 period, and T5 period in FIG. 23 when the optical path switching unit 40 switches the optical path of blue light B to the first optical path, emission of the blue light B from the LD module 2 is stopped, and the blue light B is not irradiated onto the phosphor wheel 54. Therefore, as illustrated in FIG. 23, during T3 period, T4 period, and T5 period, an output of light from the light source device 101A is stopped.

During T1 period when the optical path switching unit 40 switches the optical path of the blue light B to the second optical path, the blue light B is emitted from the LD module 2, and the blue light B emitted from the LD module 2 reflects on the first area 41A (reflection area 41A) of the mirror wheel 41, and is then guided to the second optical path. Therefore, the blue light B is not irradiated onto the phosphor wheel 54. Further, during T1 period, the blue light B is output from the light source device 101A.

Figure 24:
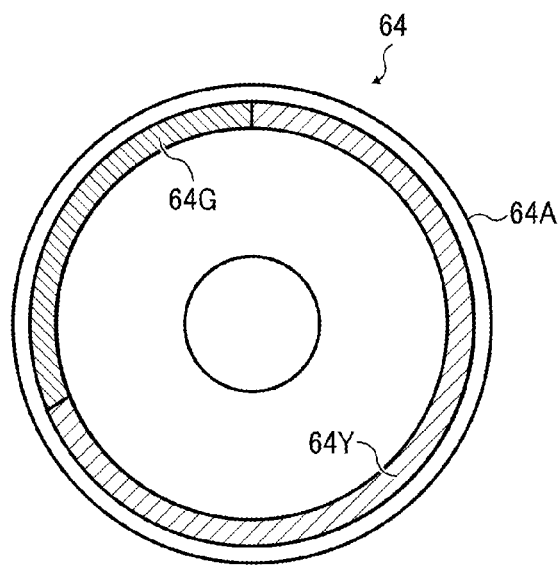
FIG. 24 is a front view of other example of a phosphor wheel of variant example 2.
Figure 25:
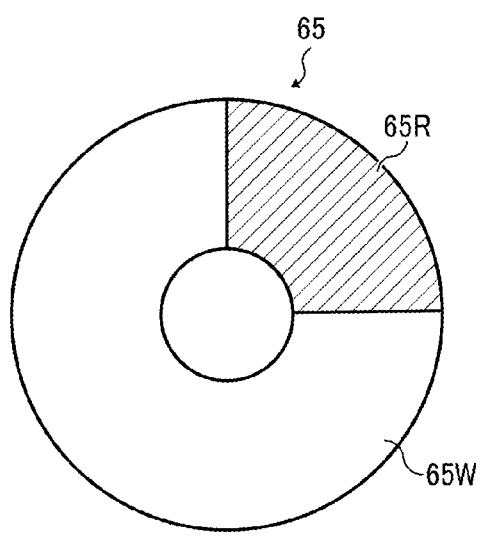
FIG. 25 is a front view of other example of a color wheel of variant example 2.

As to the variant example 2, the phosphor layer disposed on the phosphor wheel 54 is configured only with the yellow phosphor layer 54Y but not limited hereto. The phosphor layer can be configured with a plurality of phosphor layers that emit two or more color lights. For example, as illustrated in FIG. 24, a phosphor wheel 64 having a yellow phosphor layer 64Y and a green phosphor layer 64G can be employed, in which the yellow phosphor layer 64Y emits the yellow light Y having yellow wavelength range when the blue light B having blue wavelength range is irradiated, and the green phosphor layer 64G emits the green light G having green wavelength range when the blue light B having blue wavelength range is irradiated. In this example case, a color wheel 65 can be configured with two areas such as a red light passing area 65R and a translucent area 65W as illustrated in FIG. 25, in which the red light passing area 65R passes only red light having red wavelength range, and the translucent area 65W passes light as it is. In this example case, green light can be output as an exit light by passing the green light G, emitted from the green phosphor layer 64G of the phosphor wheel 64, through the translucent area 65W of the color wheel 65.

A description is given of a configuration and operation of an image projection apparatus such as a projector 200 employing any one of the light source device 1, 1A, 101, 101A described in the above first example embodiment including variant example 1 and the second example embodiment including variant example 2.

Figure 26A:
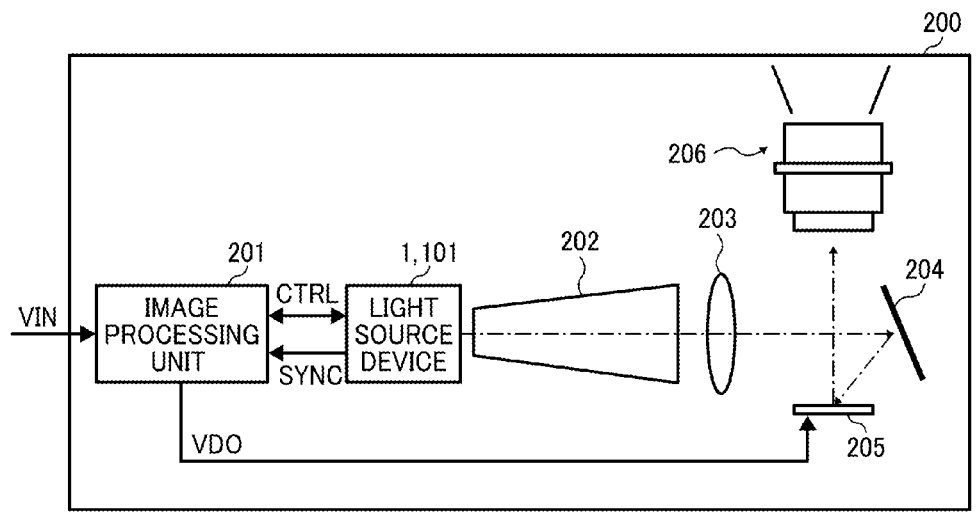
FIG. 26A is a schematic plan view of a projector of one example embodiment.
Figure 26B:
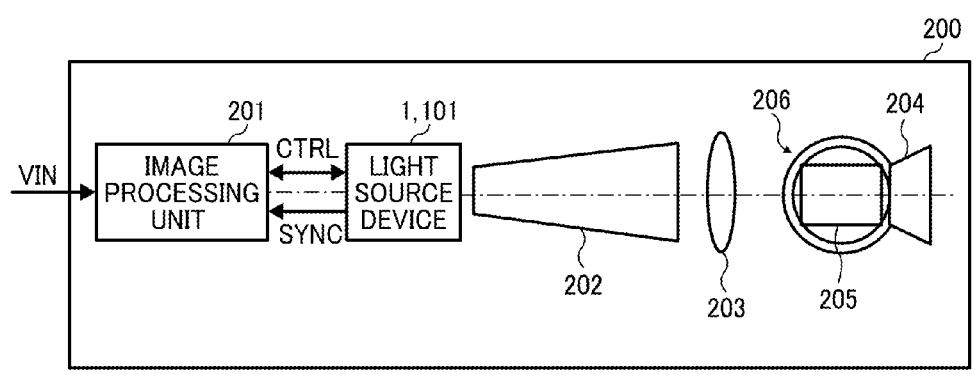
FIG. 26B is a schematic front view of the projector of FIG. 26A.

FIG. 26A is a schematic plan view of the projector 200, and FIG. 26B is a schematic front view of the projector 200. The light source device 1, 1A, 101, 101A (hereinafter light source device 1(101)), employable for the projector 200 outputs three primary color light of red, blue, green, and yellow light (total of four color lights) time-divisionally. When an image signal VIN is input, an image processing unit 201 outputs data of rotation cycle of the motor 5 and the motor 42 to the light source device 1(101) based on frame frequency via the control signal CTRL. Further, the image processing unit 201 receives synchronization signal SYNC from the light source device 1(101), and sequentially outputs drive-waveform data for the LD 2A and the LED 31 based on the synchronization signal SYNC.

When the image processing unit 201 outputs each data to the light source device 1 (101), and completes settings for conducting a target operation as above described, the image processing unit 201 outputs an activation command to the light source device 1 (101) to activate the light source device 1 (101). When the light source device 1 (101) is activated, the red, blue, green, and yellow light (R, B, G, Y) can be sequentially output at a given timing as above described. The light output from the light source device 1 (101) is converted to uniform flat face illumination light by a light guide device 202, and is irradiated onto a display pixel area of a display element 205 such as a digital micro mirror device (DMD) via a condensing lens 203 and a reflection mirror 204.

The image processing unit 201 further generates display signal corresponding to each color of illumination light based on the image signal VIN, and converts the display signal to signal VDO used for driving the display element 205, and outputs the signal VDO. With this configuration, illumination light that enters the display element 205 is converted to image light, and the image light is projected to a screen via a projection lens 206 to display an image. The display element 205 is, for example, a digital micro mirror device (DMD), in which each mirror composes each pixel of a display image, and an angle of each mirror with respect to the entered illumination light is controlled to convert the illumination light to the image light.

As to the light source device 1 (101), when abnormal rotation occurs to the motor 5 of the phosphor wheels 4, 34, 44, the abnormal rotation information is reported to the image processing unit 201 using control signal CTRL output from the control unit 20 of the light source device 1 (101). Then, the image processing unit 201 generates a message of abnormal rotation occurrence based on the information, and outputs the message superimposed to the signal VDO. With this configuration, a message image can be displayed on a projection screen, and can be informed to a user.

Figure 27:
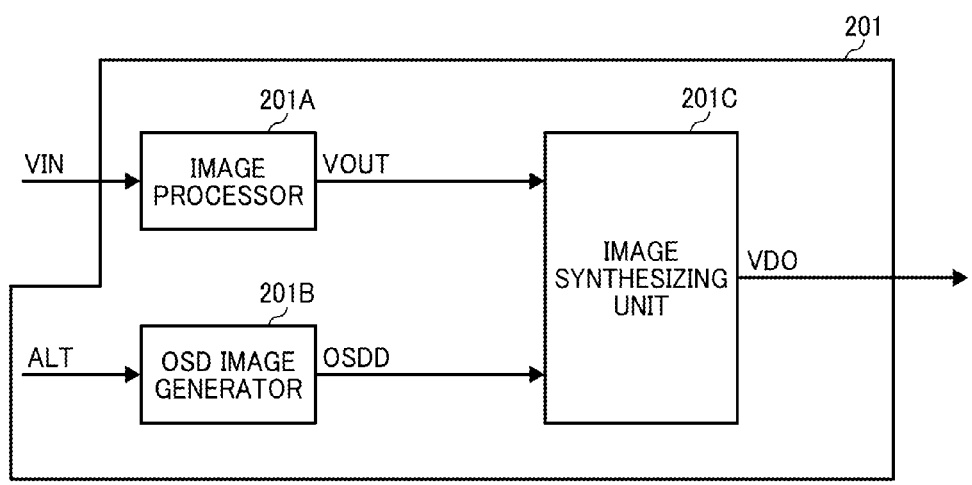
FIG. 27 is a block diagram of the image processing unit of the projector of FIG. 26A.

FIG. 27 is a block diagram of the image processing unit 201. An input image signal VIN is input to an image processor 201A, and receives data processing, as required, and is output as a display-use image signal VOUT. Upon detecting occurrence of abnormal rotation of the motor 5 used for the phosphor wheels 4, 34, 44, the image processing unit 201 asserts signal ALT. When the signal ALT is asserted, an OSD image generator 201B generates image data OSDD for the above mentioned message. An image synthesizing unit 201C synthesizes the display-use image signal VOUT and the image data OSDD to generate a signal VDO for driving the display element 205, and outputs the signal VDO.

Figure 28:
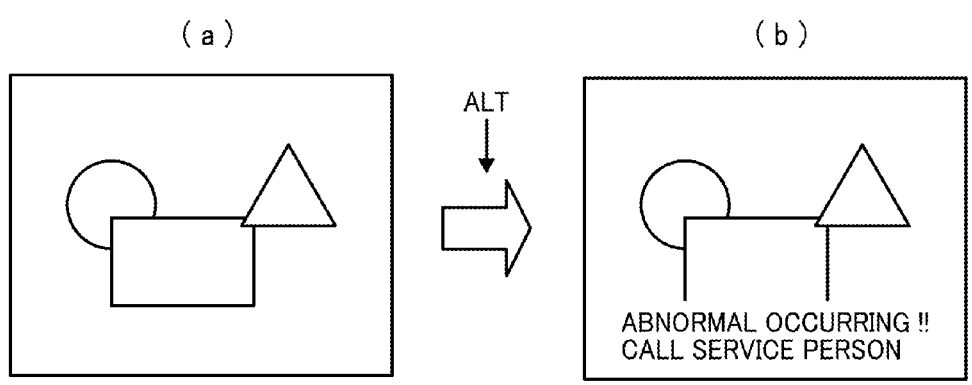
FIG. 28($a$) is an example image when an abnormal rotation does not occur to a motor of a light source device and a phosphor wheel normally rotates.

FIG. 28(a) is an example image when the phosphor wheel 4 normally rotates (i.e., abnormal rotation does not occur to the motor 5), and FIG. 28(b) is an example image when abnormal rotation occurs to the motor 5. Even if the abnormal rotation occurs to the motor 5, light can be output from the light source device 1 (101) continuously, with which an image including a message can be displayed on a projection screen as illustrated in FIG. 28(b), with which abnormal rotation can be informed to a user.

The above described examples are just examples, and the present invention includes following embodiments having following effects.

Embodiment A

A light source device includes a first light source to emit first light having a first wavelength range such as the LD module 2 that emits blue light having blue wavelength range; a wavelength convertor, disposed on an optical path of the first light emitted from the first light source, to receive the first light having the first wavelength range from the first light source to emit light having other wavelength range different from the first wavelength range of the first light such as the phosphor layers 4R, 4G, 4Y, 34G, 44G that emits light having red wavelength range, green wavelength range, yellow wavelength range; a cyclical movement unit to cyclically move the wavelength convertor while crossing the optical path of the first light emitted from the first light source such as the phosphor wheel 4, 34, 44 and the motor 5; optical parts to define an optical path of the first light emitted from the first light source, and an optical path of the light emitted from the wavelength convertor such as the light condensing optical system 6A, 6B, 6C, dichroic mirrors 7A, 7B, 7C, 7D, and relay lenses 8A, 8B, 8C, 8D; a detector to detect a cyclic movement condition of the cyclical movement unit; and a received light quantity reducing unit to reduce light quantity of the first light received by the wavelength convertor when a cyclic movement condition detected by the detector satisfies a given abnormal condition such as when a cyclic movement condition detected by the detector is less than the given rotation speed, while outputting the first light emitted from first the light source having the first wavelength range or the light having other wavelength range emitted from the wavelength convertor to outside the light source device. The received light quantity reducing unit includes, for example, the wheel advancing and retreating mechanism 10, the optical path switching unit 40, and the control unit 20.

In this embodiment A, when abnormality occurs to the cyclic movement condition of the cyclical movement unit that cyclically moves the wavelength convertor, and a given abnormal condition is satisfied, light quantity of light, emitted from the light source, received by the wavelength convertor is reduced. Light quantity received by the wavelength convertor can be reduced, for example, by reducing light quantity emitted at the light source, and by reducing light quantity of light irradiated onto the wavelength convertor. Further, light quantity received by the wavelength convertor can be reduced by blocking light, emitted from the light source, received by the wavelength convertor. By reducing light quantity received by the wavelength convertor, light quantity received and irradiated at one point on the wavelength convertor per unit time becomes smaller even if abnormal condition such as speed reduction or stop of the cyclical movement of the wavelength convertor occurs, with which temperature increase of the wavelength convertor can be suppressed, and deterioration of the wavelength convertor can be suppressed.

Further, as to this embodiment A, even if the given abnormal condition is satisfied, light emitted from the light source or light emitted from the wavelength convertor can be output to the outside. Therefore, an image projectable by using the light emitted from the light source device can be used to report required information such occurrence of the abnormality and coping process for the abnormality to a user. Therefore, required information can be reported to a user without using a dedicated reporting unit. As to the above described configuration that light emitted from a light source can be output, even if the cyclic movement of the wavelength convertor stops when the wavelength convertor does not exist on an optical path of emitted from the light source, an image projectable by using the light emitted from the light source device can be used to report required information to a user.

Embodiment B

As to the Embodiment A, the cyclical movement unit includes a rotatable member such as the phosphor wheel 4, 34, 44 disposed on an optical path of light emitted from the light source, and a drive unit such as the motor 5 that drives a rotation of the rotatable member. By rotating the rotatable member, the wavelength convertor disposed on the rotatable member cyclically moves while crossing the optical path of light emitted from the light source. The received light quantity reducing unit is, for example, the wheel advancing and retreating mechanism 10 that displaces the rotatable member outside an optical path of light emitted from the light source when a cyclic movement condition detected by the detector satisfies a given abnormal condition while outputting light having a given wavelength range emitted from the light source or light having other wavelength range emitted from the wavelength convertor to the outside.

With this configuration, when the given abnormal condition is satisfied, the rotatable member can be moved outside the optical path of light emitted from the light source, with which deterioration of the wavelength convertor can be suppressed. In this configuration, a special light source controlling that can reduce light quantity emitted from a light source is not required, with which the light source control can be simplified, and further, light emitted from a light source can be output to the outside to project an image used for reporting information to a user.

Embodiment C

As to the Embodiment A, the optical parts include an optical path switching unit such as the optical path switching unit 40 that can switch an optical path of light emitted from the light source between a first optical path, in which light is received by the wavelength convertor, and a second optical path, in which light is not received by the wavelength convertor but is output to the outside. When a cyclic movement condition detected by the detector satisfies a given abnormal condition, the received light quantity reducing unit controls the optical path switching unit to maintain the optical path of light emitted from the light source at the second optical path. With this configuration, when the given abnormal condition is satisfied, by using a simple configuration and operation such as controlling a movement of the optical path switching unit, irradiation of light from a light source to the wavelength convertor can be blocked or prevented, with which deterioration of the wavelength convertor can be suppressed.

Embodiment D

As to the Embodiment C, a light source light quantity reducing unit such as the control unit 20 is included. The light source light quantity reducing unit reduces light quantity emitted from the light source at least during a period that the received light quantity reducing unit controls the optical path switching unit to maintain the optical path of light emitted from the light source at the second optical path. With this configuration, unnecessary power consumption can be suppressed.

Embodiment E

As to the Embodiments C or D, the optical path switching unit can be configured using, for example, a switching diffraction grating that can switch an optical path by passing or reflecting pluralization light depending on voltage applied to the switching diffraction grating. With this configuration, a drive unit such as a motor is not required, with which a configuration having enhanced reliability for preventing malfunction and abnormality can be devised.

Embodiment F

As to the Embodiments C or D, the optical path switching unit includes an optical path switching member such as the mirror wheel 41 including a second area 41B (light passing area 41B) that passes incident light, and a first area 41A (reflection area 41A) that reflects the incident light, and a drive unit such as the motor 42 that drives the optical path switching member so that one of the light passing area 41B and the reflection area 41A exists on an optical path of the light from the light source. With this simple configuration, an optical path of light emitted from a light source can be switched between the first optical path, in which light is received by the wavelength convertor, and the second optical path, in which light is not received by the wavelength convertor but is output to the outside Embodiment G A light source device includes a first light source to emit first light having a first wavelength range such as the LD module 2 that emits blue light having blue wavelength range; a second light source to emit second light having a second wavelength range different from the first wavelength range such as LED module 30 that emits red light having red wavelength range; a wavelength convertor, disposed on an optical path of the first light emitted from the first light source, to receive the first light having the first wavelength range from the first light source, and to emit third light having a third wavelength range different from the first wavelength range of the first light emitted from the first light source and the second wavelength range of the second light emitted from the second light source such as the phosphor layers 34G, 44G that emits green light having green wavelength range; a cyclical movement unit to cyclically move the wavelength convertor while crossing the optical path of the first light emitted from the first light source such as the phosphor wheel 34, 44 and the motor 5; optical parts to define an optical path of the first light emitted from the first light source, and an optical path of the second light from the second light source, and an optical path of the third light emitted from the wavelength convertor such as the light condensing optical system 6A, 6B, 6C, dichroic mirrors 7A, 7B, 7C, 7D, and relay lenses 8A, 8B, 8C, 8D; a detector to detect a cyclic movement condition of the cyclical movement unit; and a light source control unit such as the control unit 20 to reduce light quantity of the first light emitted from the first light source or stop emission of the first light from the first light source when a cyclic movement condition detected by the detector satisfies a given abnormal condition such as when a cyclic movement condition detected by the detector is less than the given rotation speed.

As to this Embodiment G, when abnormality occurs to the cyclic movement condition of the cyclical movement unit that cyclically moves the wavelength convertor, and a given abnormal condition is satisfied, light quantity emitted from the light source is reduced, or light emission from the light source is stopped.

With this configuration, because light quantity, coming from the light source, received by the wavelength convertor is reduced or becomes zero, light quantity received and irradiated at one point on the wavelength convertor per unit time becomes smaller even if abnormal condition such as speed reduction or stop of the cyclical movement of the wavelength convertor occurs, with which temperature increase of the wavelength convertor can be suppressed, and deterioration of the wavelength convertor can be suppressed. Further, as to this Embodiment G, the first light source and the second light source are provided. Therefore, even if light quantity emitted from the first light source is reduced, or an emission of light from the first light source is stopped when the given abnormal condition is satisfied, the second light from the second light source can be output to the outside. With this configuration, by using an image projected by using light emitted from the light source device, required information such as occurrence of the abnormality and coping process for the abnormality can be reported or informed to a user without using a dedicated reporting unit in this embodiment G.

Embodiment H

As to any one of the Embodiments A to G, the wavelength convertor is phosphor. With this simple configuration, light having a wavelength range different from a wavelength range of light emitted from a light source can be generated with a simple configuration.

Embodiment I

As to any one of the Embodiments A to H, a synchronization signal generation unit and a light source drive control unit are provided. The synchronization signal generation unit such as the synchronization signal generation unit 25 generates synchronization signal SYNC. The light source drive control unit such as the LD drive unit 22 conducts a drive control of the light source based on the synchronization signal. When a given normal condition is satisfied such as when a cyclic movement condition detected by the detector is a given rotation speed, the synchronization signal generation unit generates a synchronization signal synchronized to a cyclical movement of the wavelength convertor by the cyclical movement unit. Further, when a cyclic movement condition detected by the detector satisfies a given abnormal condition, the synchronization signal generation unit generates a pre-set synchronization signal not synchronized to a cyclical movement of the wavelength convertor by the cyclical movement unit. When abnormality occurs to the cyclical movement of the wavelength convertor, and a synchronization signal is generated from a detection result of the abnormal cyclical movement, driving condition of a light source becomes inappropriate.

As to this Embodiment I, when abnormality occurs to the cyclical movement of the wavelength convertor, a given abnormal condition is satisfied, and a pre-set synchronization signal not synchronized to a cyclical movement of the wavelength convertor is generated, and drive control of the light source is conducted based on the pre-set synchronization signal, with which inappropriate driving condition of the light source can be avoided.

Embodiment J

An image projection apparatus includes the light source device 1, 101 of any one of the Embodiments A to I, the display element 205 such as DMD to modulate irradiated light to image light based on image signals, an illumination optical system including the light guide device 202, the condensing lens 203 and the reflection mirror 204 to illuminate light emitted from the light source device to the display element 205, a projection optical system including the projection lens 206 to project the image light modulated by the display element 205, and a display control unit such as the image processing unit 201 to control the display element 205. The display control unit controls the display element 205 to project a message image such as image informing abnormality when the cyclic movement condition detected by the detector of the light source device satisfies a given abnormal condition. With this configuration, as to the light source device, when abnormality occurs to the cyclical movement of the wavelength convertor, image informing abnormality can be projected by using light emitted from the light source device, with which information such as occurrence of the abnormality and coping process for the abnormality can be informed to a user. Therefore, required information can be informed to a user without using a dedicated reporting unit.

As to the above described example embodiments of the light source device, and the image projection apparatus having the light source device, when abnormality occurs to a cyclical movement unit that cyclically moves a rotatable member such as a wavelength convertor disposed with phosphor, required information can be reported a user without using a dedicated reporting unit.

As the above described example embodiment, when abnormality occurs to the cyclical movement unit that cyclically moves a wavelength convertor, without using a dedicated reporting unit, required information such as information of occurrence of abnormality and a coping process for abnormality can be reported to a user.

Numerous additional modifications and variations are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. A light source device, comprising:
 a first light source configured to emit first light having a first wavelength range;
 a wavelength convertor, disposed on an optical path of the first light emitted from the first light source, configured to receive the first light having the first wavelength range from the first light source to emit light having other wavelength range different from the first wavelength range of the first light;
 a cyclical movement unit configured to cyclically move the wavelength convertor while crossing the optical path of the first light emitted from the first light source, and
  the cyclical movement unit includes a rotatable member disposed on the optical path of the first light emitted from the first light source;
 optical parts configured to define an optical path of the first light emitted from the first light source, and an optical path of the light emitted from the wavelength convertor;
 a detector configured to detect a cyclic movement condition of the cyclical movement unit;
 a received light quantity reducing unit configured to reduce light quantity of the first light received by the wavelength convertor when a cyclic movement condition detected by the detector satisfies a specified abnormal condition while outputting the first light emitted from the first light source having the first wavelength range or the light having other wavelength range emitted from the wavelength convertor to outside the light source device; and
 a drive unit configured to drive rotation of the rotatable member; and wherein
  the cyclical movement unit is configured to rotate the rotatable member to cyclically move the wavelength convertor disposed on the rotatable member while crossing the optical path of the first light emitted from the first light source, and
  the received light quantity reducing unit is configured to move the rotatable member outside the optical path of the first light emitted from the first light source when a cyclic movement condition detected by the detector satisfies a specified abnormal condition while outputting the first light having the first wavelength range emitted from the first light source or the light having other wavelength range emitted from the wavelength convertor to the outside the light source device.

2. The light source device of claim 1, wherein the wavelength convertor includes a layer of phosphor.

3. The light source device of claim 1, further comprising:
 a synchronization signal generation unit configured to generate a synchronization signal; and
 a light source drive control unit configured to conduct drive control of the first light source based on the synchronization signal,
 wherein
  when a cyclic movement condition detected by the detector satisfies a specified normal condition, the synchronization signal generation unit is configured to generates a synchronization signal synchronized to the cyclical movement of the wavelength convertor by the cyclical movement unit, and
  when a cyclic movement condition detected by the detector satisfies a specified abnormal condition, the synchronization signal generation unit is configured to generates a desired synchronization signal not synchronized to the cyclical movement of the wavelength convertor by the cyclical movement unit.

4. An image projection apparatus comprising:
a light source device of claim 1;
a display element configured to modulate irradiated light to image light based on image signal;
an illumination optical system configured to illuminate light emitted from the light source device to the display element;
a projection optical system configured to project the image light modulated by the display element; and
a display control unit configured to control the display element to project an image informing abnormality when a cyclic movement condition detected by the detector of the light source device satisfies a specified abnormal condition.

5. The light source device of claim 1, further comprising:
a light source light quantity reducing unit configured to reduce light quantity emitted from the first light source device at least during a period that the received light quantity reducing unit controls an optical path switching unit to maintain the optical path of first light emitted from the light source at the second optical path.

6. The light source device of claim 5, wherein the optical path switching unit is a switching diffraction grating configured to switch an optical path of pluralization light by passing or reflecting the pluralization light depending on voltage applied to the switching diffraction grating.

7. The light source device of claim 6, wherein
the optical path switching unit includes an optical path switching member including a light passing area configured to pass incident light, and a reflection area that reflects the incident light; and
a drive unit configured to drive the optical path switching member to position one of the light passing area and the reflection area on the optical path of the first light from the first light source.

8. The light source device of claim 1, wherein
the cyclic movement condition of the cyclical movement unit is a rotation speed of the cyclical movement unit; and
the specified abnormal condition is the rotation speed of the cyclical movement unit being lower than a desired rotation speed of the cyclical movement unit.

9. The light source device of claim 1, wherein the first light source is a light source configured to emit a blue light.

10. A light source device of claim 1, comprising:
a first light source configured to emit first light having a first wavelength range;
a wavelength convertor, disposed on an optical path of the first light emitted from the first light source, configured to receive the first light having the first wavelength range from the first light source to emit light having other wavelength range different from the first wavelength range of the first light;
a cyclical movement unit configured to cyclically move the wavelength convertor while crossing the optical path of the first light emitted from the first light source;
optical parts configured to define an optical path of the first light emitted from the first light source, and an optical path of the light emitted from the wavelength convertor;
a detector configured to detect a cyclic movement condition of the cyclical movement unit;
a received light quantity reducing unit configured to reduce light quantity of the first light received by the wavelength convertor when a cyclic movement condition detected by the detector satisfies a specified abnormal condition while outputting the first light emitted from the first light source having the first wavelength range or the light having other wavelength range emitted from the wavelength convertor to outside the light source device; and
wherein
the optical parts include an optical path switching unit configured to switch the optical path of the first light emitted from the first light source between a first optical path, in which the first light is received by the wavelength convertor, and a second optical path, in which the first light is output to the outside the light source device without reception by the wavelength convertor, and
when a cyclic movement condition detected by the detector satisfies a specified abnormal condition, the received light quantity reducing unit is configured to controls the optical path switching unit to maintain the optical path of the first light emitted from the first light source at the second optical path.

11. The light source device of claim 10, further comprising:
a light source light quantity reducing unit configured to reduce light quantity emitted from the first light source device at least during a period that the received light quantity reducing unit controls the optical path switching unit to maintain the optical Path of first light emitted from the light source at the second optical path.

12. The light source device of claim 10, wherein the optical path switching unit is a switching diffraction grating configured to switch an optical path of pluralization light by passing or reflecting the pluralization light depending on voltage applied to the switching diffraction grating.

13. The light source device of claim 10, wherein
the optical path switching unit includes an optical path switching member including a light passing area configured to pass incident light, and a reflection area that reflects the incident light; and
a drive unit configured to drive the optical path switching member to position one of the light passing area and the reflection area on the optical path of the first light from the first light source.

14. The light source device of claim 10, wherein the wavelength convertor includes a layer of phosphor.

15. The light source device of claim 10, further comprising:
a synchronization signal generation unit configured to generate a synchronization signal; and
a light source drive control unit configured to conduct drive control of the first light source based on the synchronization signal,
wherein
when a cyclic movement condition detected by the detector satisfies a specified normal condition, the synchronization signal generation unit is configured to generate a synchronization signal synchronized to the cyclical movement of the wavelength convertor by the cyclical movement unit, and
when a cyclic movement condition detected by the detector satisfies a specified abnormal condition, the synchronization signal generation unit is configured to generate a desired synchronization signal not synchronized to the cyclical movement of the wavelength convertor by the cyclical movement unit.

16. The light source device of claim 10, wherein
the cyclic movement condition of the cyclical movement unit is a rotation speed of the cyclical movement unit; and the specified abnormal condition is the rotation speed of the cyclical movement unit being lower than a desired rotation speed of the cyclical movement unit.

17. The light source device of claim 10, wherein the first light source is a light source configured to emit a blue light.

18. A light source device, comprising:
a first light source configured to emit first light having a first wavelength range;
a second light source configured to emit second light having a second wavelength range different from the first wavelength range;
a wavelength convertor, disposed on an optical path of the first light emitted from the first light source, configured to receive the first light having the first wavelength range from the first light source and to emit third light having a third wavelength range different from the first wavelength range of the first light emitted from the first light source and the second wavelength range of the second light emitted from the second light source;
a cyclical movement unit configured to cyclically move the wavelength convertor while crossing the optical path of the first light emitted from the first light source, and
includes a rotatable member disposed on the optical path of the first light emitted from the first light source;
optical parts configured to define an optical path of the first light emitted from the first light source, and an optical path of the second light from the second light source, and an optical path of the third light emitted from the wavelength convertor;
a detector configured to detect a cyclic movement condition of the cyclical movement unit;
a light source control unit configured to reduce light quantity of the first light emitted from the first light source or stop emission of the first light from the first light source when a cyclic movement condition detected by the detector satisfies a specified abnormal condition;
a drive unit configured to drive rotation of the rotatable member; and
wherein
the cyclical movement unit is configured to rotate the rotatable member to cyclically move the wavelength convertor disposed on the rotatable member while crossing the optical path of the first light emitted from the first light source, and
the received light quantity reducing unit is configured to displace the rotatable member outside the optical path of the first light emitted from the first light source when a cyclic movement condition detected by the detector satisfies a specified abnormal condition while outputting the first light having the first wavelength range emitted from the first light source or the light having other wavelength range emitted from the wavelength convertor to the outside the light source device.

19. A light source device, comprising:
a first light source configured to emit first light having a first wavelength range;
a second light source configured to emit second light having a second wavelength range different from the first wavelength range;
a wavelength convertor, disposed on an optical path of the first light emitted from the first light source, configured to receive the first light having the first wavelength range from the first light source and to emit third light having a third wavelength range different from the first wavelength range of the first light emitted from the first light source and the second wavelength range of the second light emitted from the second light source;
a cyclical movement unit configured to cyclically move the wavelength convertor while crossing the optical path of the first light emitted from the first light source;
optical parts configured to define an optical path of the first light emitted from the first light source, and an optical path of the second light from the second light source, and an optical path of the third light emitted from the wavelength convertor,
the optical parts including an optical path switching unit configured to switch the optical path of the first light emitted from the first light source between a first optical path, in which the first light is received by the wavelength convertor, and a second optical path, in which the first light is output to the outside the light source device without reception by the wavelength convertor;
a detector configured to detect a cyclic movement condition of the cyclical movement unit;
a light source control unit configured to reduce light quantity of the first light emitted from the first light source or stop emission of the first light from the first light source when a cyclic movement condition detected by the detector satisfies a specified abnormal condition; and
wherein when a cyclic movement condition detected by the detector satisfies a specified abnormal condition, the received light quantity reducing unit is configured to control the optical path switching unit to maintain the optical path of the first light emitted from the first light source at the second optical path.

* * * * *